US008788460B2

(12) United States Patent
Simek et al.

(10) Patent No.: US 8,788,460 B2
(45) Date of Patent: *Jul. 22, 2014

(54) EXPLORING ATTACHED AND UNATTACHED CONTENT DATABASES

(75) Inventors: Patrick John Simek, Redmond, WA (US); Samer Fouad Sawaya, Snoqualmie, WA (US); Troy Ralph Starr, Sammamish, WA (US); Jeffrey Lamar McDowell, Redmond, WA (US); Elisabeth Katarina Olson, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/834,733

(22) Filed: Jul. 12, 2010

(65) Prior Publication Data

US 2010/0281049 A1 Nov. 4, 2010

Related U.S. Application Data

(63) Continuation-in-part of application No. 12/137,556, filed on Jun. 12, 2008, now Pat. No. 8,635,188.

(51) Int. Cl.
*G06F 7/00* (2006.01)
*G06F 17/00* (2006.01)
*G06F 17/30* (2006.01)

(52) U.S. Cl.
CPC ............................... *G06F 17/30398* (2013.01)
USPC ............................ 707/649; 707/609; 707/662

(58) Field of Classification Search
CPC .................. G06F 17/30082; G06F 17/30156; G06F 17/302; G06F 17/30215
USPC .................... 707/3–4; 717/100; 719/310, 332
See application file for complete search history.

(56) References Cited

U.S. PATENT DOCUMENTS

| 4,864,497 | A | | 9/1989 | Lowry et al. |
| 6,038,610 | A | * | 3/2000 | Belfiore et al. ............... 719/310 |
| 6,233,623 | B1 | | 5/2001 | Jeffords et al. |
| 6,463,442 | B1 | * | 10/2002 | Bent et al. ..................... 719/332 |

(Continued)

OTHER PUBLICATIONS

Restore a farm (SharePoint Foundation 2010)—Published Date: Apr. 16, 2010. Retrieved from the internet: <URL: http://technet.microsoft.com/en-us/library/ee428311(office.14).aspx>, 6 pp.

(Continued)

*Primary Examiner* — Susan Chen
(74) *Attorney, Agent, or Firm* — Merchant & Gould P.C.

(57) ABSTRACT

Various technologies and techniques are disclosed for searching for and extracting data from databases of content management applications. User input is received to connect to a database or database snapshot of an application, and a connection is established. When the database is not part of a current live instance of the application, an emulation is performed such that the database is treated like it is attached to the current live instance of the application. The user is able to browse and/or search for content, including documents, in the database or database snapshot without having to explore individual site collection structure and user interfaces of individual sites. A site collection user interface (UI), a site selector UI, and/or a list selector UI, for example, provide data entry fields for entering search requirements. Unattached databases can be managed using commands, such as using an object model or command line.

20 Claims, 18 Drawing Sheets

(56) References Cited

U.S. PATENT DOCUMENTS

| | | |
|---|---|---|
| 6,480,862 B1 | 11/2002 | Gall |
| 6,658,589 B1 | 12/2003 | Taylor |
| 6,754,679 B2 | 6/2004 | Oheda |
| 6,772,177 B2 | 8/2004 | Hsiao et al. |
| 6,910,112 B2 | 6/2005 | Berkowitz et al. |
| 6,944,662 B2 | 9/2005 | Devine et al. |
| 7,158,978 B2 | 1/2007 | Goodwin |
| 7,206,391 B2 | 4/2007 | Chiu et al. |
| 7,418,440 B2 | 8/2008 | Kubaitis |
| 7,464,366 B2 * | 12/2008 | Shukla et al. ............... 717/100 |
| 2003/0069880 A1 * | 4/2003 | Harrison et al. ............... 707/3 |
| 2003/0204516 A1 | 10/2003 | Klosterhalfen et al. |
| 2004/0139128 A1 | 7/2004 | Becker et al. |
| 2005/0015386 A1 | 1/2005 | Mortensen et al. |
| 2005/0166082 A1 | 7/2005 | Williams et al. |
| 2006/0122992 A1 * | 6/2006 | Bellaiche et al. ............... 707/4 |
| 2007/0156700 A1 | 7/2007 | Becker |
| 2007/0168401 A1 | 7/2007 | Kapoor et al. |
| 2007/0180289 A1 | 8/2007 | Chai et al. |
| 2008/0046462 A1 | 2/2008 | Kaufman et al. |
| 2008/0082572 A1 | 4/2008 | Ballard et al. |
| 2008/0168078 A1 | 7/2008 | Francis |
| 2009/0313280 A1 | 12/2009 | Sawaya et al. |
| 2009/0319582 A1 | 12/2009 | Simek et al. |

OTHER PUBLICATIONS

Metalogic Selective Restore Manager Pro for SharePoint—Retrieved Date: Apr. 28, 2010. Retrieved from the internet: <URL: http://www.metalogix.net/products/selective-restore-manager-pro-for-sharepoint/.> 3 pp.

Harold Kosch, "Distributed Multimedia Database Technologies supported by MPEG-7 and MPEG-21", Nov. 24, 2003, pp. 1-27.

* cited by examiner

UNATTACHED CONTENT DATABASE RECOVERY – STEP 1 OF 2: CONNECT TO DATABASE

USE THIS PAGE TO CONNECT TO A CONTENT DATABASE THAT YOU WISH TO EXPLORE IN ORDER TO RECOVER DATA. THE DATABASE DOES NOT NEED TO BE ATTACHED TO THE CONTENT MANAGEMENT FARM.

DATABASE NAME AND AUTHENTICATION

SPECIFY THE DATABASE SERVER AND CONTENT DATABASE NAME TO CONNECT TO.

USE OF WINDOWS AUTHENTICATION IS STRONGLY RECOMMENDED. TO USE SQL AUTHENTICATION, SPECIFY THE CREDENTIALS WHICH WILL BE USED TO CONNECT TO THE DATABASE.

DATABASE SERVER
DEV3\OFFICESERVERS — 242

DATABASE NAME
WSS_CONTENT_91E28648476240 — 244

DATABASE AUTHENTICATION
246 — ● WINDOWS AUTHENTICATION (RECOMMENDED)
248 — ○ SQL AUTHENTICATION

250 — ACCOUNT [            ]
252 — PASSWORD [            ]

254 — [NEXT]   256 — [CANCEL]

FIG. 3

UNATTACHED CONTENT DATABASE RECOVERY – STEP 2 OF 2: CONNECT TO DATABASE

USE THIS PAGE TO SELECT THE SITE COLLECTION, SITE, OR LIST TO BACKUP OR EXPORT.

SELECT DATA:
SITE COLLECTION: HTTP://ACME/ ▼ —262
SITE: NOT SELECTED ▼ —264
CHANGE SITE —266
CLEAR SELECTION

OPERATION TO PERFORM:
○ SITE COLLECTION BACKUP —268
⊙ EXPORT —270

FILE LOCATION:
FILE NAME: [       ] —272
274— ☐ OVERWRITE EXISTING FILES
EXAMPLE: \\BACKUP\SHAREPOINT\SITE1.BAK

INCLUDE FULL SECURITY:
☐ INCLUDE FULL SECURITY
276

INCLUDE VERSIONS:
ALL VERSIONS ▼ —278

EXPORT SETTINGS:
280— ☐ HALT ON WARNING
282— ☐ HALT ON ERROR
284— ☐ NO LOG FILE
286— CAB SIZE: [24]  1-1024 MEGABYTES —292
288— [PREVIOUS]   [OK]   [CANCEL]
                   290

FIG. 4

SITE COLLECTION BACKUP OR EXPORT STATUS

USE THIS PAGE TO BACKUP OR EXPORT THE CONTENTS OF A SITE COLLECTION

STATUS
▶ NO BACKUP OR RESTORE IN PROCESS — 352
▶ TIMER SERVICE IS RUNNING
▶ ADMIN SERVICE IS RUNNING

[ REFRESH ]   [ DELETE BACKUP JOB ]   [ DELETE EXORT JOB ]
                          354

SITE COLLECTION BACKUP

| | |
|---|---|
| STATUS | OPERATION FAILED — 356 |
| REQUESTED BY | DOMAIN\URL |
| SITE COLLECTION URL | HTTP://ACME/ |
| FAILURE MESSAGE | [FAILURE MESSAGE DETAILED HERE] |
| FILENAME | D:\FOO.BAK |
| OVERWRITE | YES |

SITE COLLECTION EXPORT

STATUS    NO OPERATION IN PROGRESS

FIG. 6

EXPLORING ATTACHED AND UNATTACHED CONTENT DATABASES

CROSS-REFERENCE TO RELATED APPLICATION

This application is a continuation-in-part of, and claims priority to, U.S. patent application Ser. No. 12/137,556, filed on Jun. 12, 2008, by Inventors Sawaya, et al., and entitled, "TECHNIQUES FOR EXTRACTING DATA FROM CONTENT DATABASES." The entirety of the aforementioned application is incorporated herein by reference.

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright.COPYRGT.2010, Microsoft Corp.

BACKGROUND

Web-based content management applications such as MICROSOFT® SharePoint typically include files that are located on a Web server along with data that is stored in a database. For example, one or more Web pages that are used to access the data in the database are stored on a Web server. In order to make the content accessible to end users, an attachment process is typically utilized to set up the live instance of the content management application. In other words, a site administrator makes the Web pages and database "live" to end users so that the data can be accessed and updated.

One of the current issues that arise with content management applications has to do with properly backing up the data contained therein. Due to the fact that content management applications have data stored in more places than just a physical database, a separate information technology organization or team is typically responsible for maintaining and backing up content management applications than is responsible for backing up other databases in the company. This division of responsibility can often pose a problem in corporations since the database backups become disconnected from the maintenance operations being performed by the team responsible for content management applications.

When backups are performed for content management applications, the entire database is typically backed up, along with the directories on the file server that contains the other data for the application. Because entire databases are being backed up, it can be very difficult to go back to a past database backup and extract a specific unit of logical data as it once existed on a company's content management application (such as SharePoint or as similar technology). Users are not able to extract specific data from a database that is not attached to a "live" instance of the content management application. Also, it is not generally possible to know which database backup contains the logical data that a user may be looking for due to multiple backups, security/access issues, and the standard user interface may not contain one centralized location for exploring content to be recovered and navigating to the location that needs to be backed up or exported. It is typically a time-intensive process for an administrator to drill down to find the content. The administrator often has to access every site to find the URL and then run code to extract the information. In accessing every site, the confidentiality and privacy of site content can be compromised.

SUMMARY

Various technologies and techniques are disclosed for searching for and extracting data from databases of content management applications. Input is received from a user to connect to a database of a content management application. A connection is established to the database. When the database or database snapshot is not part of a current live instance of the content management application, an emulation is performed so that the database is treated like it is actually attached to the current live instance of the content management application. The user is able to browse and/or search the database to find specific data, such as through a site collection user interface (UI), a site selector UI, and/or a list selector UI, for example. In further embodiments, other or additional types of UIs or selector UIs are used. In an alternative embodiment, for example, a specific document UI or selector UI is used. In other alternative embodiments, the types of UIs or selector UIs are combined into a single UI or selector UI, such as a single UI or selector UI allowing browsing and/or searching of the database to explore site collections, sites, lists, and/or documents within the same UI or selector UI. In another alternative embodiment, the single UI or selector UI allows browsing and/or searching to explore a subcombination, such as, for example, two or three (but not all), of the categories of site collections, sites, lists, and documents. The specific names and types of UIs or selector UIs described herein are offered by way of example. Other types of UIs or selector UIs are contemplated in embodiments herein without departing from the spirit and scope of the present disclosure. The selector UIs provide data entry fields, according to embodiments, for entering search requirements. In an embodiment, the user is presented search results meeting the search requirements. The user can walk through these search results or further narrow the search. Embodiments thus provide for browsing and/or searching for specific content in a content database which may or may not be attached to the current live instance of the content management application, without having to explore individual site collection structure and user interfaces of individual sites, e.g., Web sites. The user is instead provided with an index view to find desired content. The user is thus provided with the ability to explore site collections, sites, lists, and/or documents from attached and/or unattached content databases. In one implementation, the user can export selected data and/or back up selected data from the database of the content management application.

In an embodiment, stored procedures on the back-end database servers enable such browsing, searching, and exporting of data from attached and unattached content databases. Examples of such stored procedures include: proc_GetSiteCollectionBestMatch; proc_GetSiteCollectionSubset; proc_GetWebSubset; proc_GetWebBestMatch; proc_GetListSubset; and proc_GetListBestMatch.

In one implementation, unattached databases of a content management application can be managed using one or more commands. Input is received from a user to specify connection options for connecting to an unattached database of a content management application. The connection is established with the unattached database so that the database is treated like it is attached to a live instance of the content management application. The user can use one or more commands to manipulate the unattached database. In one implementation, the commands can be source code that utilizes an object model of the content management application to manipulate the database. In another implementation, the commands can be performed from a command line.

In another implementation, orphaned databases, orphaned sites, or orphaned site collections, for example, can be detected and deleted from the content management application. A selection is received from a user to connect to a database of a content management application. When the database is part of a current live instance of a content management application, any orphaned sites or orphaned site collections, for example, that are in the database but that are not in an index used to access the content management application are identified. One or more portions of any orphaned sites or orphaned site collections, for example, that were identified are deleted.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 3 is a simulated screen for one implementation that illustrates connection settings for connecting to an unattached database of a content management application in accordance with an embodiment of the present disclosure.

FIG. 4 is a simulated screen for one implementation that illustrates some exemplary data export options for the unattached database selected in FIG. 3 in accordance with an embodiment of the present disclosure.

FIG. 6 is a simulated screen for one implementation that illustrates a status of an export or a backup that was performed in accordance with an embodiment of the present disclosure.

DETAILED DESCRIPTION

Figure 1:
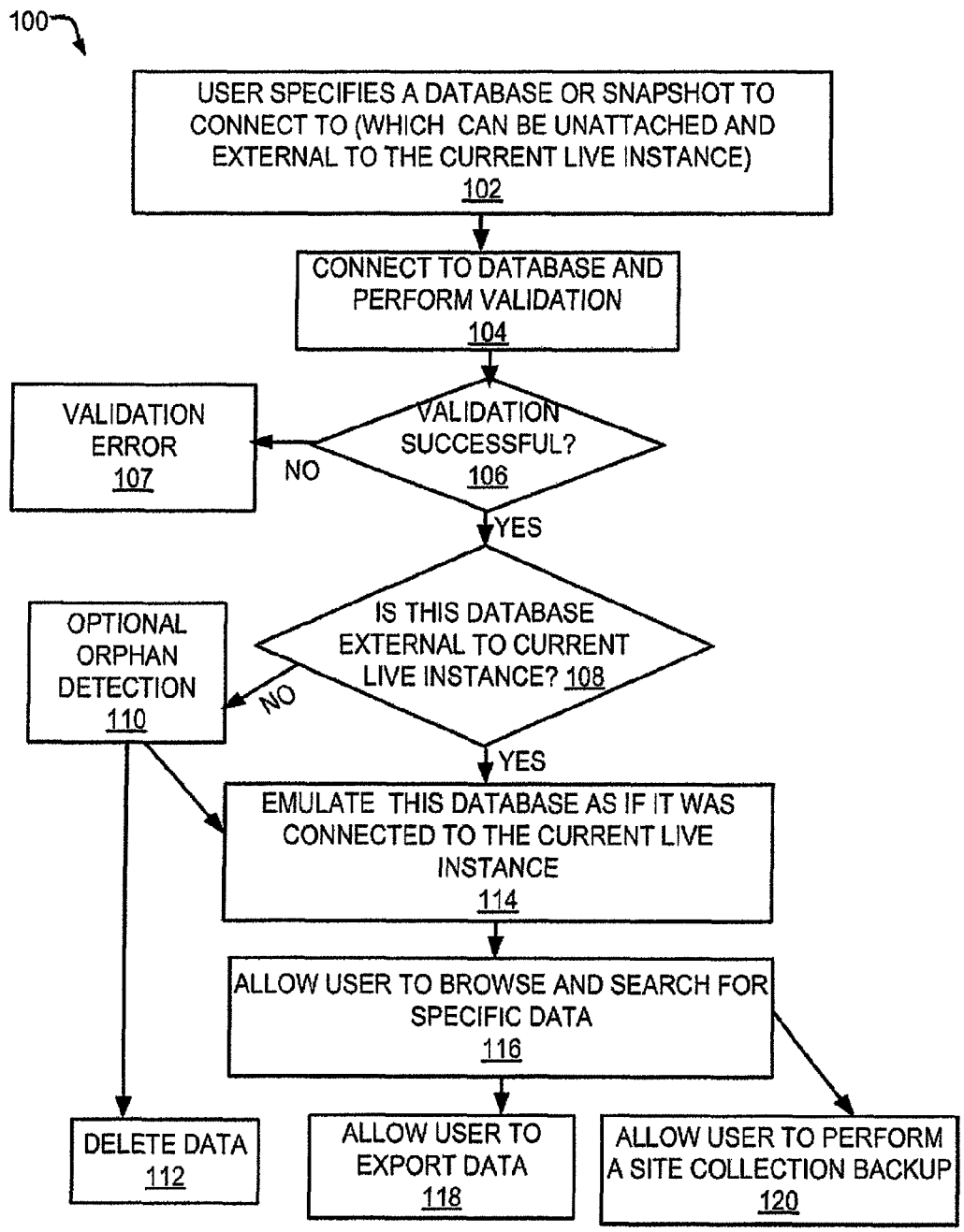
FIG. 1 is a high level process flow diagram for one implementation illustrating the stages involved in extracting data from content databases in accordance with an embodiment of the present disclosure.

The technologies and techniques herein may be described in the general context as an application for managing databases of content management applications, but the technologies and techniques also serve other purposes in addition to these. In one implementation, one or more of the techniques described herein can be implemented as features within an online content management application such as MICROSOFT® SharePoint, or from any other type of program or service that manages content management applications. In another implementation, one or more of the techniques described herein are implemented as features with other applications that deal with accessing data in and/or extracting data from databases of content management applications.

As noted in the Background section, when backups are performed for content management applications, the entire database is typically backed up, along with the directories on the file server that contains the other data for the application. It can be very difficult to go back to a past database backup and extract a specific unit of logical data as it once existed on a company's content management application. The term "content management application" as used herein is meant to include an application that allows users to store various content in a structured or unstructured format. Examples of a content management application can include an application that provides functionality to allow administrators and/or end users to manage content, or an internet site that uses a database as a back end.

Furthermore, with existing content management applications, users may face difficulty in extracting specific data, especially when the desired data is contained in a database that is not attached to a "live" instance of the content management application. The term "live instance" as used herein is meant to include a running instance of a content management application and the one or more databases that store the data for that application that are attached to that content management system. Also, current systems do not provide the user with ways to determine which database backup of a content management application contains the logical data that a user may be looking for.

With current systems, the administrator typically has to detach the current live instance of the content management application, restore the entire database backup (which could be very large), and then reattach that database backup to the live instance of the content management application. This reattach process can be very burdensome on content management deployments due to the downtime and manpower involved, and can present a large amount of administrative overhead to reattach an old database back to the live instance of the content management application. Furthermore, in order to extract a specific unit of logical data from that database (once attached to the live instance), the user would typically have to write code or run a command line command to export the data, which requires advanced knowledge.

Another option that is sometimes used with current systems is to restore the database of a content management application from a backup to a test server in order to retrieve the desired data. This solution requires the purchase of additional server hardware in order to run a second content management application, plus also requires any extra software licenses. There is also extra maintenance and overhead associated with this option, so it is not usually the most desirable either.

In one implementation, techniques are described for enabling data contained in database backups, database snapshots, and/or databases of content management applications to be browsed, searched, backed up, and/or exported. Databases can be browsed that are unattached from the current live instance of the content management application. The term "unattached database" as used herein is meant to include a database that contains data for a content management application that is not currently activated on a live instance of the content management application. Once a connection is established to the unattached database (database, backup, or snapshot), the data contained in that database can then be accessed from a user interface and/or programmatically, such as from a software development application or command line.

Turning now to FIGS. 1-16, the stages for implementing one or more implementations of the data extraction tool are described in further detail. In some implementations, the processes of FIGS. 1-16 are at least partially implemented in the operating logic of computing device 1500 (of FIG. 15).

Figure 16:
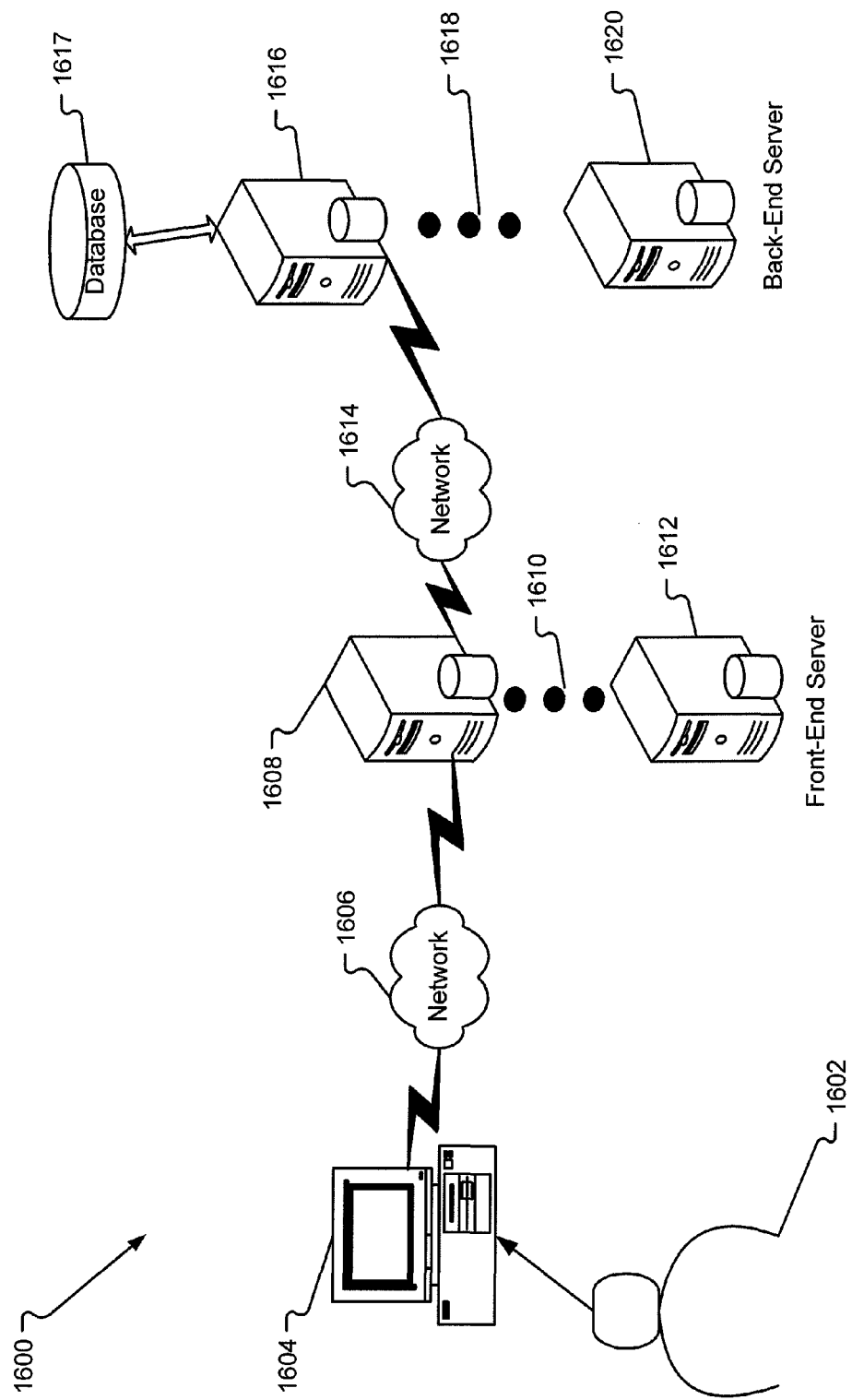
FIG. 16 illustrates an example logical representation of an environment or system for browsing and/or searching unattached and attached content databases in accordance with an embodiment of the present disclosure.

An example logical environment or system 1600 for allowing an administrator, for example, to browse and search the contents of a content database and export data from that content database, even where the content database is not attached to the front-end Web or application server(s), is shown in FIG. 16 in accordance with embodiments. A client or browser computer 1604, such as used by an administrator 1602, for example, is connected to front-end server 1608 by network 1606. In an embodiment, front-end Web or application server 1608 is a MICROSOFT SHAREPOINT server. As shown in FIG. 16, a single front-end server 1608 exists in embodiments, while other embodiments provide for multiple front-end servers or front-end server farms, as shown by ellipses 1610 and front-end server 1612. The front-end servers 1608, 1610, and 1612 shown in FIG. 16 have attached content databases as shown. In other embodiments, the databases are physically separate (not shown) from the servers. The front-end server(s) is connected by network 1614 to back-end database server 1616. Back-end database server 1616 is a SQL server according to an embodiment. While a single back-end database server 1616 exists in one embodiment, multiple back-end database servers or a back-end database server farm exists in other embodiments, as shown by ellipsis 1618 and back-end database server 1620. According to an embodiment, back-end database servers 1616, 1618, and 1620 have attached databases, while other embodiments provide for a physically separate database(s), such as content database 1617.

Logical environment 1600 is not limited to any particular implementation and instead embodies any computing environment upon which the functionality of the environment described herein may be practiced. Further, networks 1606 and 1614, although shown as individual single networks may be any types of networks conventionally understood by those of ordinary skill in the art. In accordance with an example embodiment, the network may be the global network (e.g., the Internet or World Wide Web, i.e., "Web" for short). It may also be a local area network, e.g., intranet, or a wide area network. In accordance with embodiments, communications over networks 1606 and 1614 occur according to one or more standard packet-based formats, e.g., H.323, IP, Ethernet, and/or ATM.

Further, any type of environment or system can be used in accordance with embodiments of the present disclosure. FIG. 16 is offered as an example only for purposes of understanding the teachings of the embodiments. For example, FIG. 16 shows servers 1608, 1610, 1612, 1616, 1618, and 1620. However, as noted above, embodiments also cover any type of server, separate servers, server farm, or other content management application server. Further yet, FIG. 16 shows client computer 1604. However, any type of small computer device can be used without departing from the spirit and scope of the embodiments disclosed herein. Indeed, environment or system 1600 represents a valid way of practicing embodiments disclosed herein but is in no way intended to limit the scope of the present disclosure. Further, the example network environment 1600 may be considered in terms of the specific components described, e.g., front-end server, client computer, back-end database server, etc., or, alternatively, may be considered in terms of the analogous modules corresponding to such units.

Although only one client computer 1604 is shown, for example, another embodiment provides for multiple small computer devices to communicate with front-end server 1608. In an embodiment, each small computer device communicates with the network 1606, or, in other embodiments, multiple and separate networks communicate with the small computer devices. In yet another embodiment, each small computer device communicates with a separate network.

While FIG. 16 provides an example logical environment or system 1600 for browsing and searching the contents of a content database, e.g., an unattached database, and exporting data from that content database, FIG. 1 is a high level process flow diagram 100 for one implementation illustrating the stages involved in extracting data from databases of content management applications. The user specifies a database or a database snapshot to connect to, which can be an unattached database that is external to the current live instance of the content management application (stage 102). A connection is established to the database and a validation process is performed (stage 104). During the validation process, security checks are performed to ensure that this user has authority to access the database. Database validation is also performed to ensure that the database is a valid version or database schema of the particular content management application. If validation is not successful (decision point 106), then the process ends (stage 107). If validation is successful (decision point 106), and if the database being accessed is part of the live instance of the content management application (decision point 108), then an optional orphan detection process 110 is performed to allow orphaned data to be deleted (stage 112). Orphaned sites, for example, are sites that have an inaccessible URL namespace. This could be caused by a conflict existing in the URL namespace or database corruption. The orphan detection process is described in further detail in FIG. 7 with orphaned "sites" used as an example.

If validation is successful (decision point 106), and the database being accessed is external to the current live instance of the content management application (decision point 108), then the database is emulated as if it was connected to the current live instance of the content management application (stage 114). The terms "emulated", "emulation", and "performing an emulation" as used herein are meant to include treating an unattached database as though it is attached to a live instance of a content management application on a temporary basis so that normal read or other operations that the user could perform on the live instance will work with the unattached database as well. The user is able to browse and search for specific data in the database (stage 116). The user can export data (stage 118) and/or the user can perform a site collection backup of the data (stage 120), to name a few non-limiting examples. Each of these stages will now be described in further detail in the figures that follow.

Figure 2:
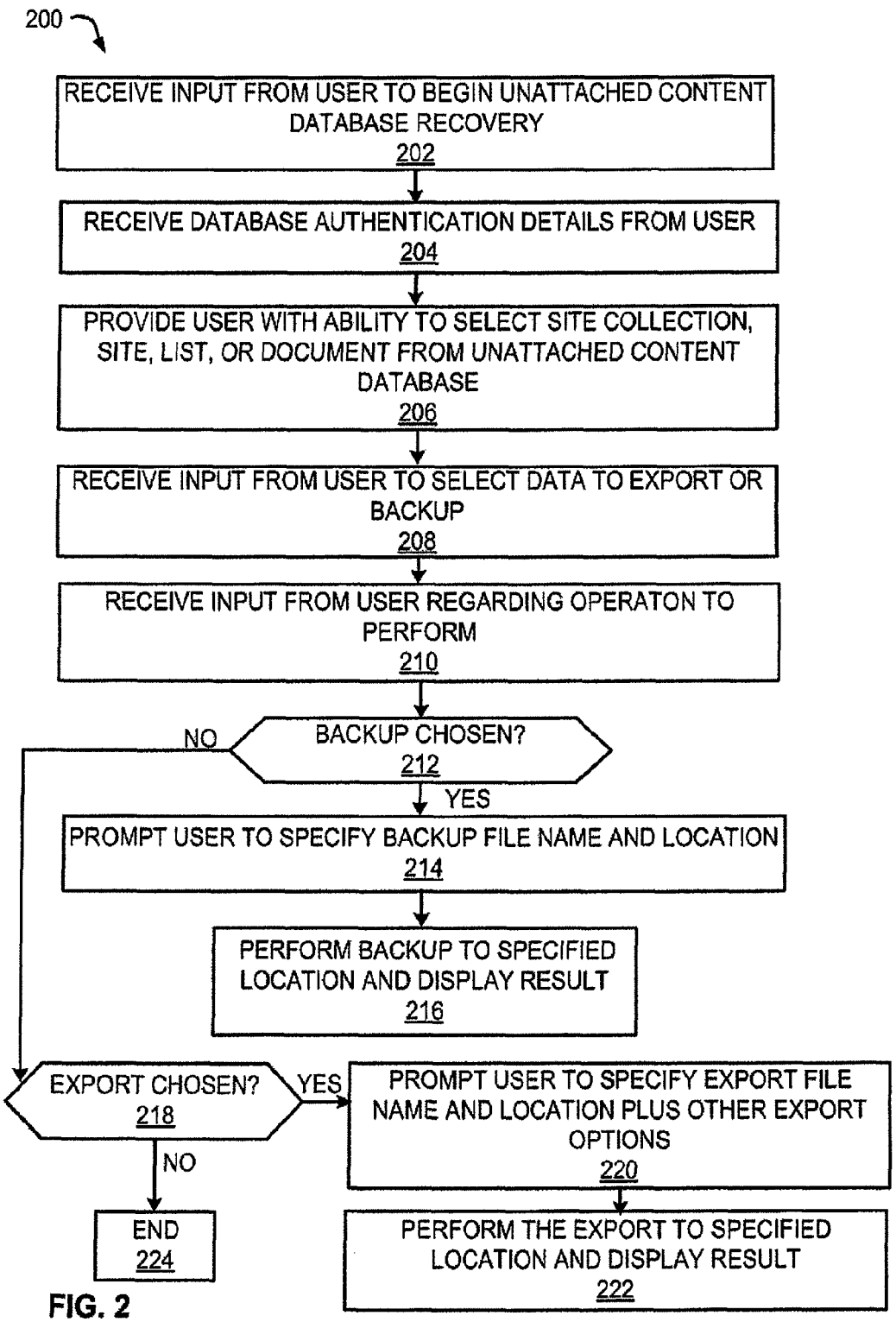
FIG. 2 is a process flow diagram for one implementation illustrating the stages involved in allowing a user to explore and retrieve data from an unattached database of a content management application in accordance with an embodiment of the present disclosure.

FIG. 2 is a process flow diagram 200 for one implementation illustrating the stages involved in allowing a user to explore and retrieve data from an unattached database of a content management application. Input is received from a user to begin an unattached content database recovery (stage 202). Database authentication details are received from the user (stage 204), such as the database to connect to, and the user name and password or other authentication details that can be used to connect to the specified database. If the database connection can be established successfully, then the user is provided with the ability to select a site collection, site, list, or document from the unattached content database (stage 206). Input is received from the user to select data to export or back up (stage 208), such as the particular site collection, site, list, or document that is desired. Input is received from the user regarding the operation to perform (stage 210), such as whether a database or site collection backup is desired or whether an export of the selected data is desired. In the examples discussed herein, database or site collection backup and export are described as example options. However, it will be appreciated that in other implementations, fewer, additional, and/or other data retrieval options could be used.

If the database or site collection backup option is chosen (decision point 212), then the user is prompted to specify the backup file name and location (stage 214). The backup is performed to the specified location and the result of the backup is optionally displayed or otherwise made available to the user (stage 216). If the export option is chosen (decision point 218), then the user is prompted to specify the export file name and location plus other export options (stage 220). The export is performed to the specified location and the result of the export is optionally displayed or otherwise made available to the user (stage 222). Simulated screens of FIGS. 3-6 will now be used to illustrate this process in further detail.

FIG. 3 is a simulated screen 240 for one implementation that illustrates connection settings for connecting to an unattached database of a content management application. The user is able to specify various database connection settings, such as the database server 242, database name 244, and the database authentication method to use. In the example shown, there are two possible types of database authentication: Windows Authentication 246 and SQL Authentication 248. These authentication methods are just examples and other operating system or database authentication methods can be used in alternate implementations. In this example, when SQL Authentication 248 is chosen, then the account 250 and password 252 fields are enabled to allow the user to specify those details. Upon selecting the cancel option 256, the user could cancel the process of connecting to an unattached database to recover data. Upon selecting the next option 254, a screen such as FIG. 4 is displayed to allow the user to select the type of data operation to be performed on the unattached database.

FIG. 4 is a simulated screen 260 for one implementation that illustrates some exemplary data export options for the unattached database selected in FIG. 3. Once a connection has successfully been established to the database specified in FIG. 3 and that database has been verified to contain data for the particular content management application, then the user can browse and select the specific data in the unattached database of the content management application that he/she wishes to export or back up. For example, a site collection 262 can be specified, which will back up all of the sites under that particular collection. If a specific site in that collection is desired, then the user can select the site option 264. In the current example, there is no specific site selected, and thus all sites in site collection 262 would be exported. The user can select one of the other options 266 to change the site or clear the selection, if one has been chosen.

Once the data itself has been selected, the operation to perform on that data can be chosen. In this example, the user is provided with an option to perform a site collection backup 268 or an export 270. If export 270 is chosen, then the user will need to specify the file name 272 and location to export the selected data to. Other options can also be specified, such as whether or not to overwrite existing files 274, whether or not to include full security 276, which versions 278 to include, and miscellaneous export settings, such as whether to halt on a warning 280, whether to halt on an error 282, whether or not to use a log file 284, and/or what CAB size 286 to use for each file, to name some non-limiting examples. To return to the previous screen and change to a different database, the user can select the previous option 288. Once the user has finished filling out the database export options, then the OK option 290 can be selected to perform the export. The cancel option 292 can be selected to cancel the export. If the user wishes to perform a site collection backup 268 instead of an export 270, then a screen similar to FIG. 5 can be displayed, which is discussed next.

Figure 5:
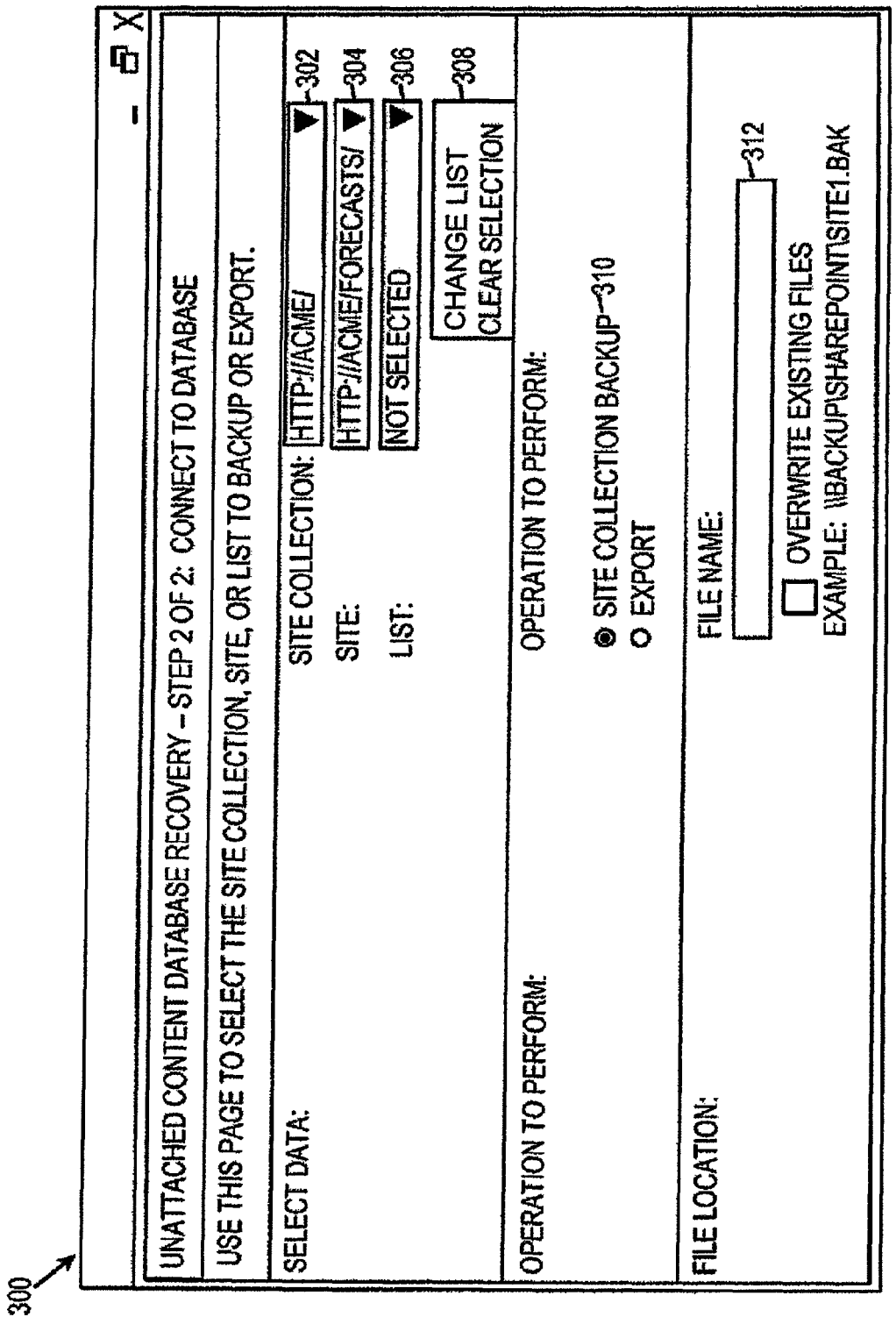
FIG. 5 is a simulated screen for one implementation that illustrates some exemplary backup options for the unattached database selected in FIG. 3 in accordance with an embodiment of the present disclosure.

FIG. 5 is a simulated screen 300 for one implementation that illustrates some exemplary backup options for the unattached database selected in FIG. 3. In this example, the user has chosen a site collection 302, and a particular site 304 that he/she wishes to back up. A list 306 can also be chosen if the user wishes to back up a particular list in the selected site 304. In alternative embodiments, a list export is performed. Site options 308 can also be specified to change the site or clear the selection. Since the user has selected the operation to perform as the site collection backup 310, the file name 312 will need to be specified to identify the file name and location where the backup should be stored.

FIG. 6 is a simulated screen 350 for one implementation that illustrates a status of an export or a backup that was performed. In one implementation, once the export operation or the backup operation has been started and/or performed, then a status screen similar to FIG. 6 is displayed or is otherwise accessible to the user to allow the user to determine the status of the operation. In one implementation, the same status screen can be used to display both export and backup statuses. In another implementation, separate status screens can be used. In the example shown in FIG. 6, an overall status 352 of whether or not any backups or exports are currently running is shown, along with options 354 to manage the jobs that are running or that have already finished running. A detailed status 356 about each respective backup or export can also be shown.

Figure 7:
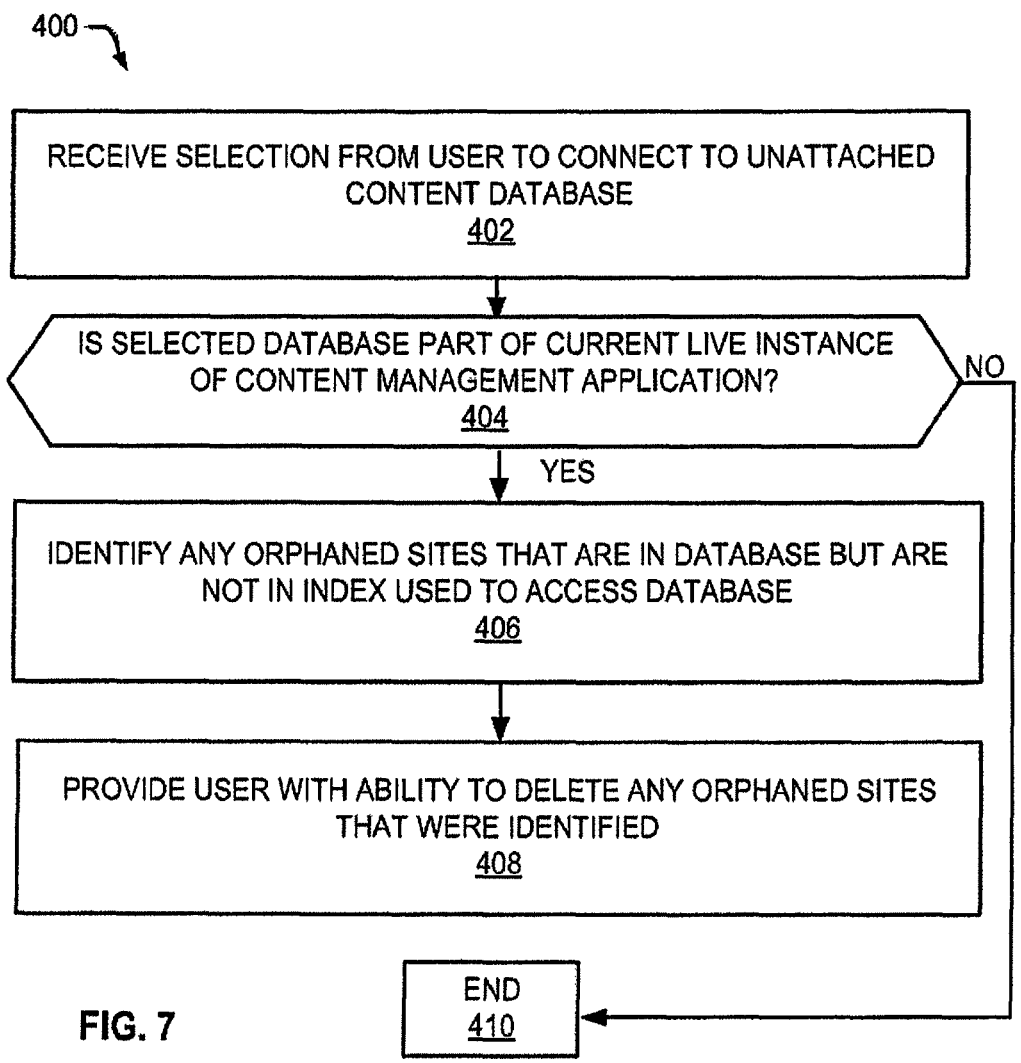
FIG. 7 is a process flow diagram for one implementation illustrating the stages involved in managing orphaned sites, for example, in an unattached database of a content management application in accordance with an embodiment of the present disclosure.

Turning now to FIG. 7, a process flow diagram 400 for one implementation is shown that illustrates the stages involved in managing orphaned sites, for example, in an unattached database of a content management application. A selection is received from the user to connect to an unattached content database (stage 402). If the selected database is part of a current live instance of the content management application (decision point 404), then any orphaned sites, for example, that are in the database but that are not in the index used to access the database are identified (stage 406). Any orphaned sites, for example, that were identified can be deleted upon receiving user confirmation that it is OK to proceed with the delete operation, or the orphaned sites can be deleted automatically (stage 408).

Figure 8:
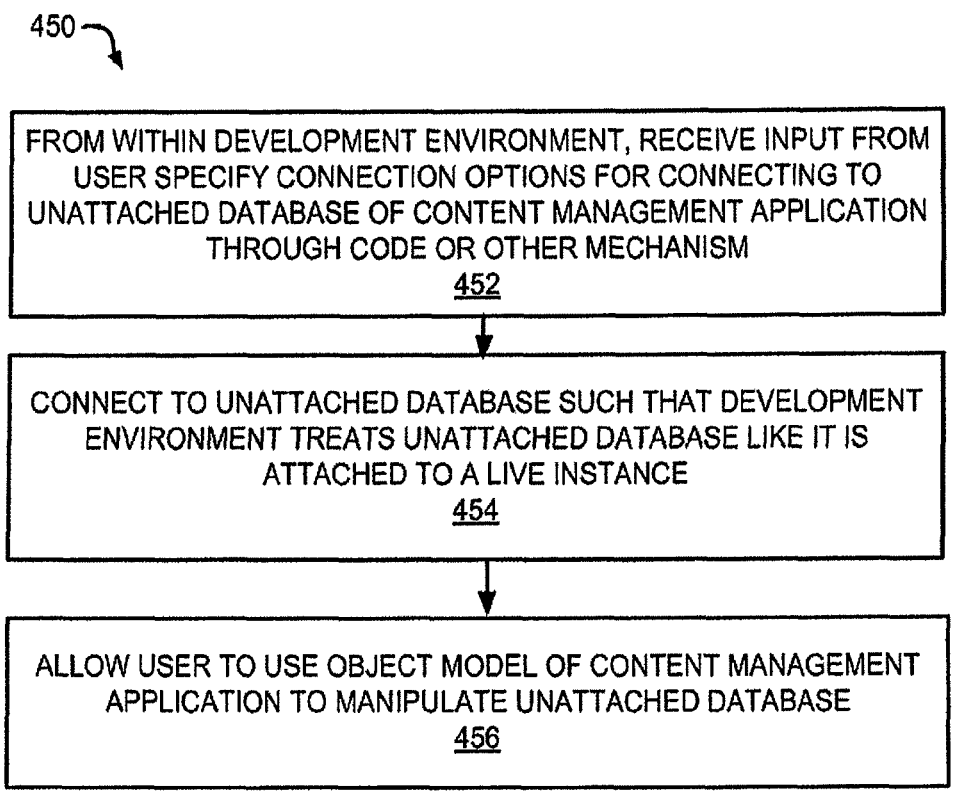
FIG. 8 is a process flow diagram for one implementation illustrating the stages involved in enabling an unattached database of a content management application to be managed programmatically in accordance with an embodiment of the present disclosure.

FIG. 8 is a process flow diagram 450 for one implementation illustrating the stages involved in enabling an unattached database of a content management application to be managed programmatically. From within a development environment, input is received from a user to specify connection options for connecting to an unattached database of a content management application through code or another mechanism (stage 452). A connection is established to the unattached database such that the development environment treats the unattached database like it is attached to a live instance of the content management application (stage 454). The user is able to write code that uses the object model of the content management application to manipulate the unattached database programmatically (stage 456). An object model (OM) interface thus allows users to search and browse through the contents and structure of the database even where the database is unattached. The overhead costs of attaching databases to a front-end Web or application server farm to browse the database are thus eliminated. Object model code may thus be written to read data from a content database which may or may not be attached to the current live application, e.g., MICROSOFT SHAREPOINT, farm. When coding through the OM interface, the external database "looks" like it is attached to the front-end server farm.

Figure 9:
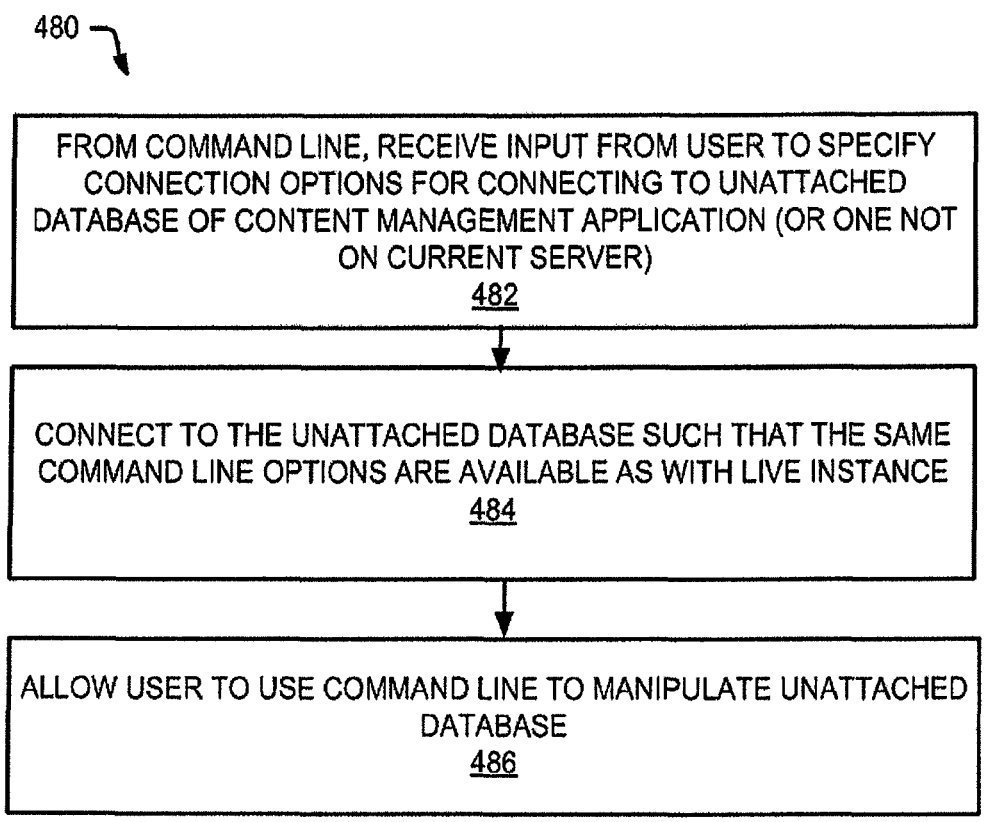
FIG. 9 is a process flow diagram for one implementation illustrating the stages involved in enabling an unattached database of a content management application to be managed from a command line in accordance with an embodiment of the present disclosure.

FIG. 9 is a process flow diagram 480 for one implementation illustrating the stages involved in enabling an unattached database of a content management application to be managed from a command line. From a command line, input is received from a user to specify connection options for connecting to an unattached database of a content management application, or a database that is not on the current server (stage 482). In an embodiment, a PowerShell command is used to connect to a database. In making the command, the user provides the name of the server and name of the database to which a connection is desired, as well as required credential information. A connection is established with the unattached database such that the same command line options are available as with a live instance of the content management application (stage 484). The user is able to use the command line to manipulate the unattached database (stage 486) (or an attached database that is located on another server). The user can thus search or browse the contents of the database with which a connection has been made through the use of the command line. Further, once the data the user desires to restore has been found through such searching and/or browsing, an export package can be created through the command line.

Figure 10A:
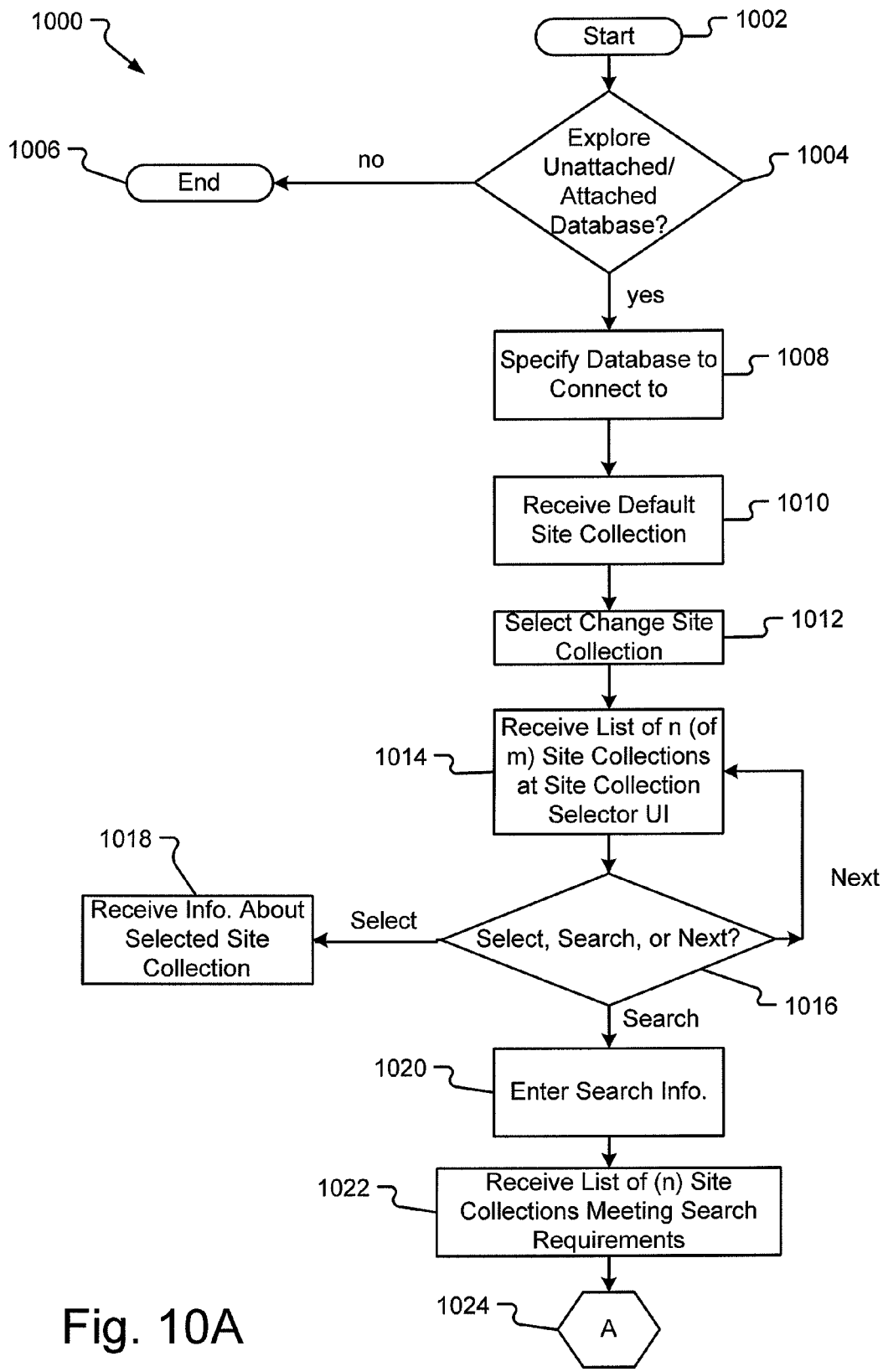
FIG. 10A illustrates a flow diagram depicting the operational characteristics of a process for searching for a specific site collection, site, and/or list in accordance with an embodiment of the present disclosure.
Figure 10B:
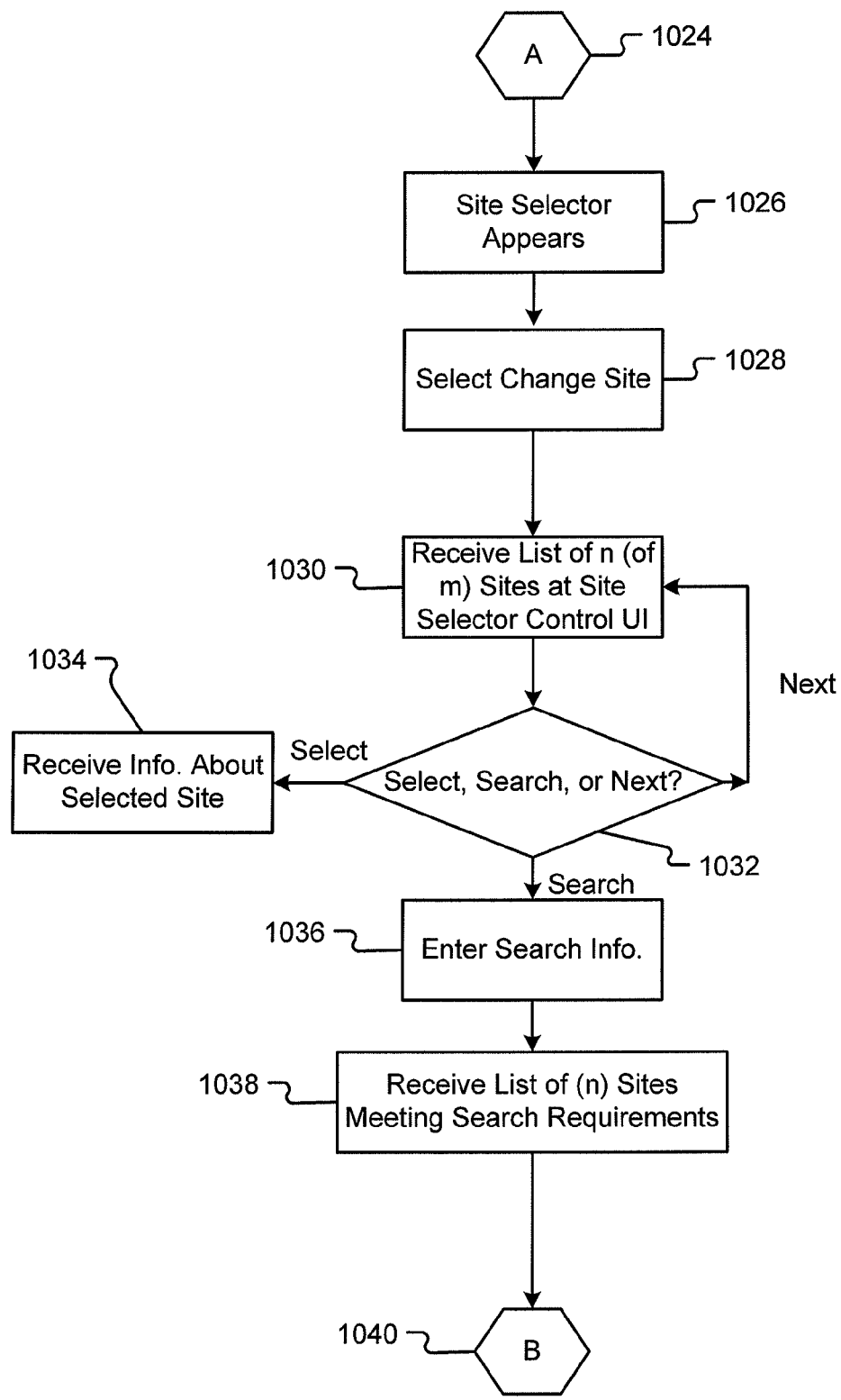
FIG. 10B depicts a flow diagram depicting the operational characteristics of a process for searching for a specific site collection, site, and/or list in accordance with an embodiment of the present disclosure.
Figure 10C:
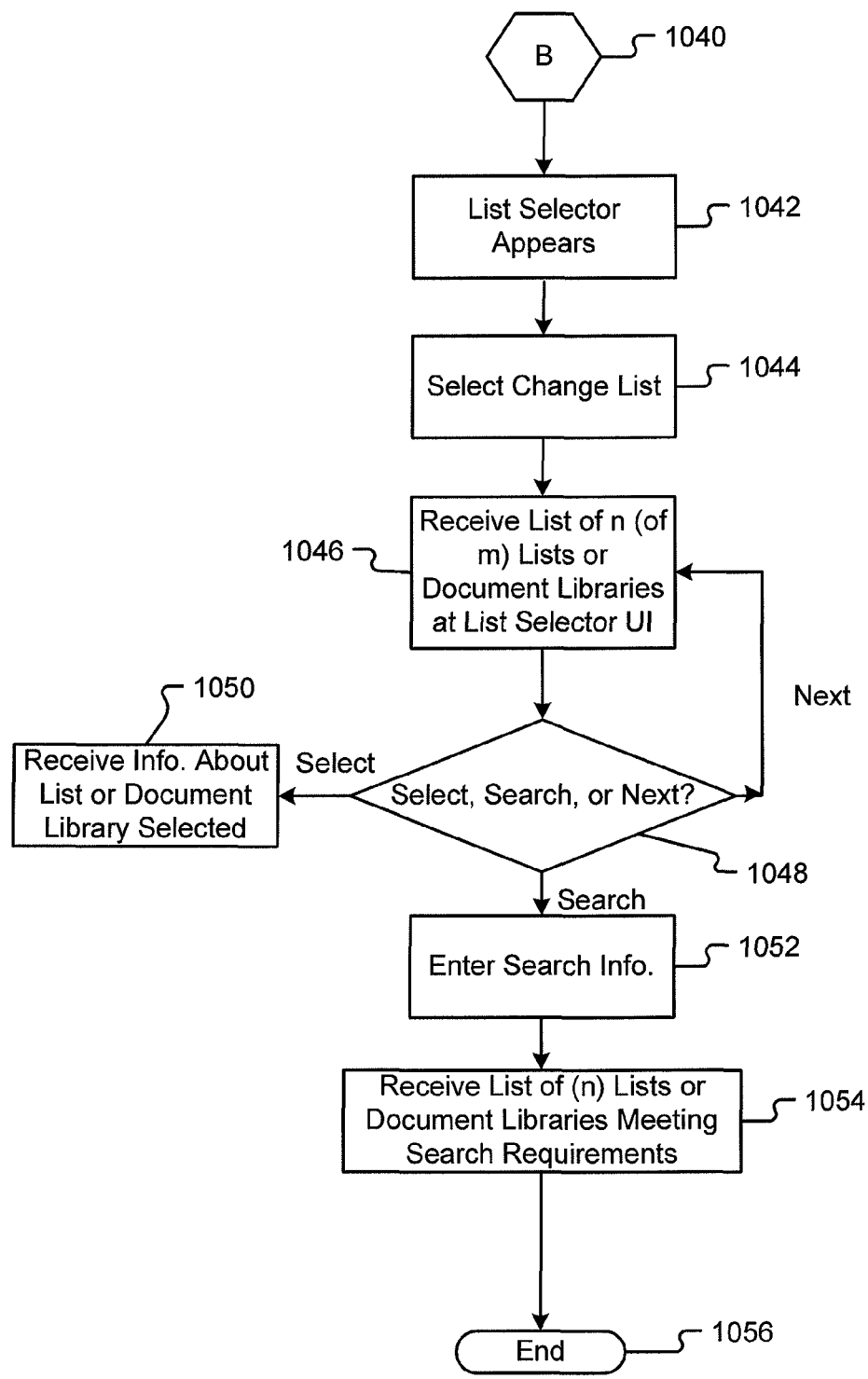
FIG. 10C illustrates a flow diagram depicting the operational characteristics of a process for searching for a specific site collection, site, and/or list in accordance with an embodiment of the present disclosure.
Figure 11:
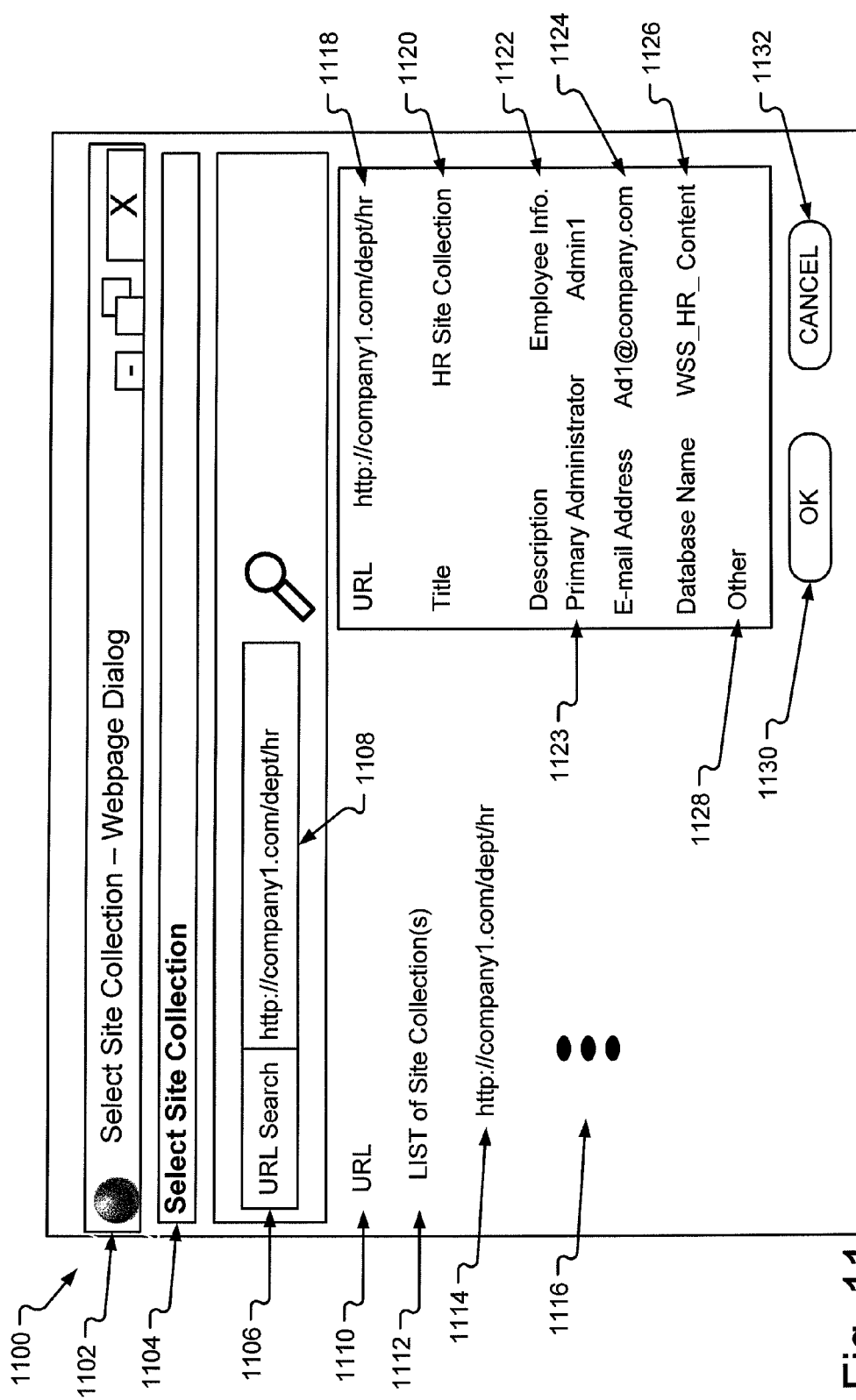
FIG. 11 depicts an example site collection selector user interface (UI) in accordance with an embodiment of the present disclosure.

While FIG. 1 above shows that a user may browser and search for specific data at stage 116, FIGS. 10A, 10B, and 10C depict the operational steps for searching for a specific site collection, site, and/or list, as disclosed in accordance with embodiments of the present disclosure. Process 1000 is initiated at START operation 1002 and proceeds to query 1004 for determining whether a user, such as administrator 1602 from a central administration user interface (UI), desires to explore and/or search a content database, in which such database may be an attached or unattached content database. If the user does not desire to explore and/or search a content database, process 1000 proceeds NO to END operation 1006, and process 1000 terminates. If the user desires to explore and/or search a content database, such as an unattached database, for example, process 1000 proceeds YES to specify database to connect to operation 1008, in which the user specifies a database name and, in embodiments, security credentials. Next, the user receives a default site collection 1010, such as the site collection 262 shown in FIG. 4 above. The user then selects to "Change Site Collection" 1012 by clicking on the down-arrow key at 262 in FIG. 4 and revealing a list of choices, including "Change Site Collection." The user is presented with a site collection selector, or site collection selector UI, such as is depicted in FIG. 11, for example, discussed below. According to an embodiment, a subset of site collections is displayed 1014. In other embodiments, a full set of site collections, if space permits, is displayed. The site collection selector UI allows the subset of site collections to be displayed based on ascending or descending order, allows a search to be conducted, and allows the user to advance to the "Next" and "Previous" pages, as well as control the number of items to be displayed or returned at any one time, according to embodiments. In alternative embodiments, the selector UI does not allow the user to control the number of items to be displayed or returned. Instead, in such alternative embodiments, the underlying stored procedure allows the caller to specify the number of items to be returned or displayed at any one time. Query 1016 thus allows the user to determine whether to select a displayed site collection, advance to the "Next" page, or search for a particular site collection to narrow down the list of displayed site collections, for example. If the user desires to advance to the "Next" page, process 1000 proceeds "Next" to receive subset of site collections 1014, in which additional site collections are displayed to the user. If the user desires to select a displayed site collection, process 1000 proceeds "Select" to receive information about the selected site collection 1018. Such information is displayed in the selector UI, according to embodiments, and includes, for example, the selected site collection's URL, Title, Description, Primary Administrator, E-mail Address, Database Name, and/or any other relevant information about the selected site collection. From there, the user can either extract the necessary information and perform an operation or move on to further drill down to sites and lists underneath the selected site collection, according to embodiments.

Returning to FIG. 10A, if the user desires to search for a particular site collection, process 1000 proceeds "Search" to enter search information 1020, in which the user enters search criteria or requirements. As shown in FIG. 11, the search for a site collection allows the user to enter a "URL" of the desired site collection, according to an embodiment. After the search is conducted, the user receives a list of site collection(s) meeting the search requirements 1022. The site collection selector thus allows the user to browse or search for a particular site collection, for example, through an index view of the site collections.

Process 1000 next continues through off-page connector A 1024 to site selector appears 1026 (from FIG. 10A to FIG.

Figure 12:
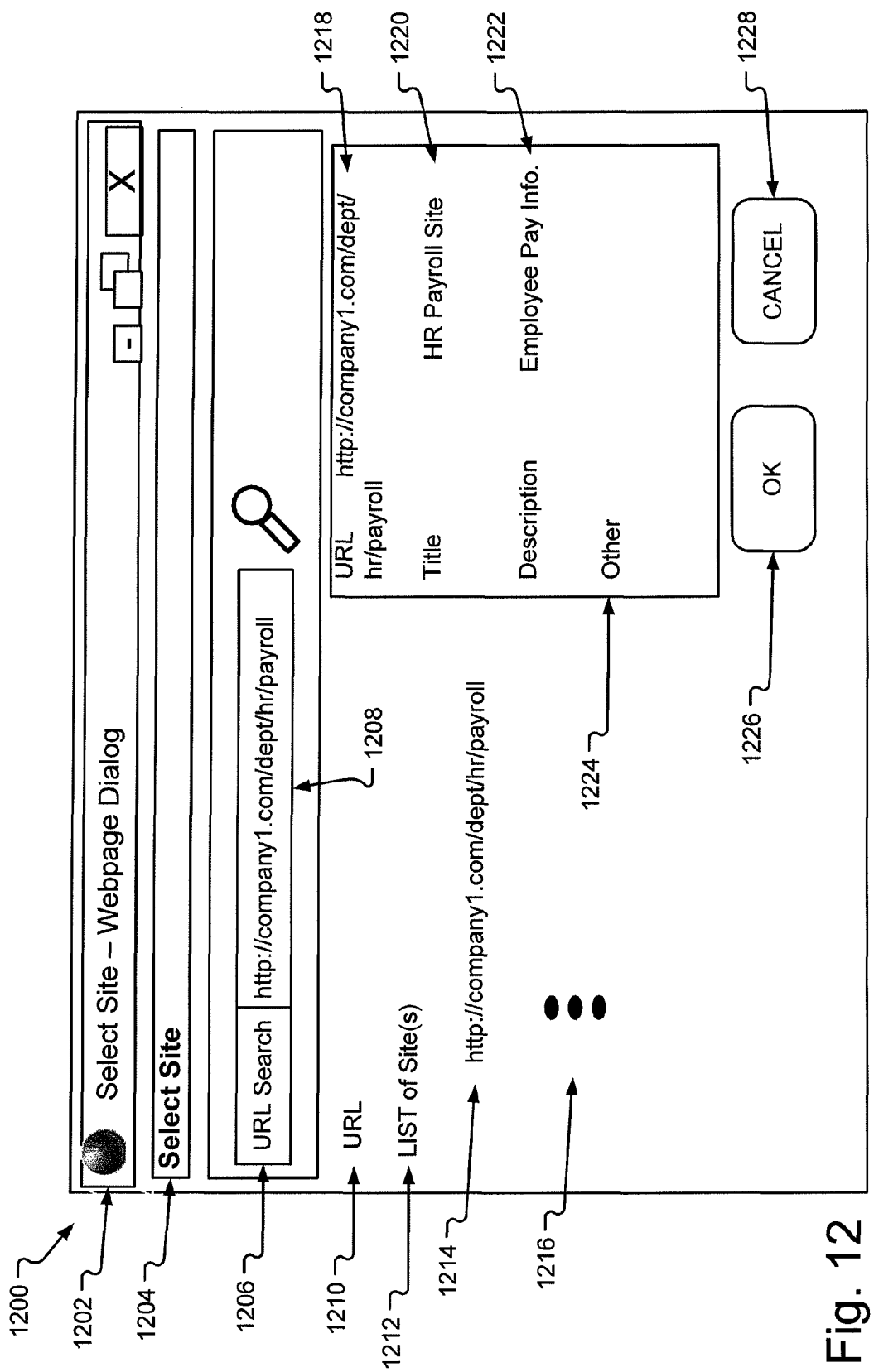
FIG. 12 depicts an example site selector user interface (UI) in accordance with an embodiment of the present disclosure.

10B), in which the ability to select a particular site, such as shown at 264 in FIG. 4, is enabled through the appearance on the page of the site option. The user, thus having previously selected a site collection, is thus given the ability to select a site within the context of the site collection. The user next selects to "Change Site" 1028, and process 1000 proceeds to receive a subset (e.g., n (of m)) of sites at site selector control, or site selector control UI 1030. The subset of sites is thus displayed at the site selector control, such as shown in FIG. 12 discussed below, based on ascending or descending order. The site selector control allows the user to search within the context of the site collection, advance to the "Next" and/or "Previous" pages, as well as control the number of items to be displayed or returned at any one time. In alternative embodiments, the selector UI does not allow the user to control the number of items to be displayed or returned. Instead, in such alternative embodiments, the underlying stored procedure allows the caller to specify the number of items to be returned or displayed at any one time. Query operation 1032 then allows the user to select a site from the subset of sites, search, or proceed to the next subset of sites. If the user desires to advance to the "Next" page, process 1000 proceeds "Next" to receive subset of sites 1030, in which additional sites are displayed to the user (unless the first subset included all sites according to some embodiments). If the user chooses to select a particular site, process 1000 proceeds "Select" to receive information about the selected site 1034. Such information includes, according to embodiments, the site's URL, Title, Description, and/or any other relevant information about the site. From there, the user can either extract the necessary information and perform an operation, or move on to further drill down to lists and document libraries within the selected site, according to embodiments.

Returning to FIG. 10B, if the user desires to search for a particular site, process 1000 proceeds "Search" to enter search information 1036, in which the user enters search criteria or requirements. As shown in FIG. 12, the search for a site allows the user to enter a "URL" of the desired site, according to an embodiment. After the search is conducted, the user receives a list of site(s) meeting the search requirements 1038. The site selector thus allows the user to browse or search for particular sites, for example, through an index view of the sites.

Process 1000 next continues through off-page connector B 1040 to list option appears 1042 (from FIG. 10B to FIG. 10C), in which the ability to select a particular list, such as shown at 306 in FIG. 5, is enabled through the appearance on the page of the list selector 1042. The user, thus having previously selected a site collection and a site, is thus given the ability to select a list or document library within the context of the site using a selector in the central administration UI, according to embodiments. In further embodiments (not shown), the user is given the ability to select a particular document within the context of the list and/or document library, for example. In such embodiments, a document selector in the central administration UI is used, for example.

Figure 13:
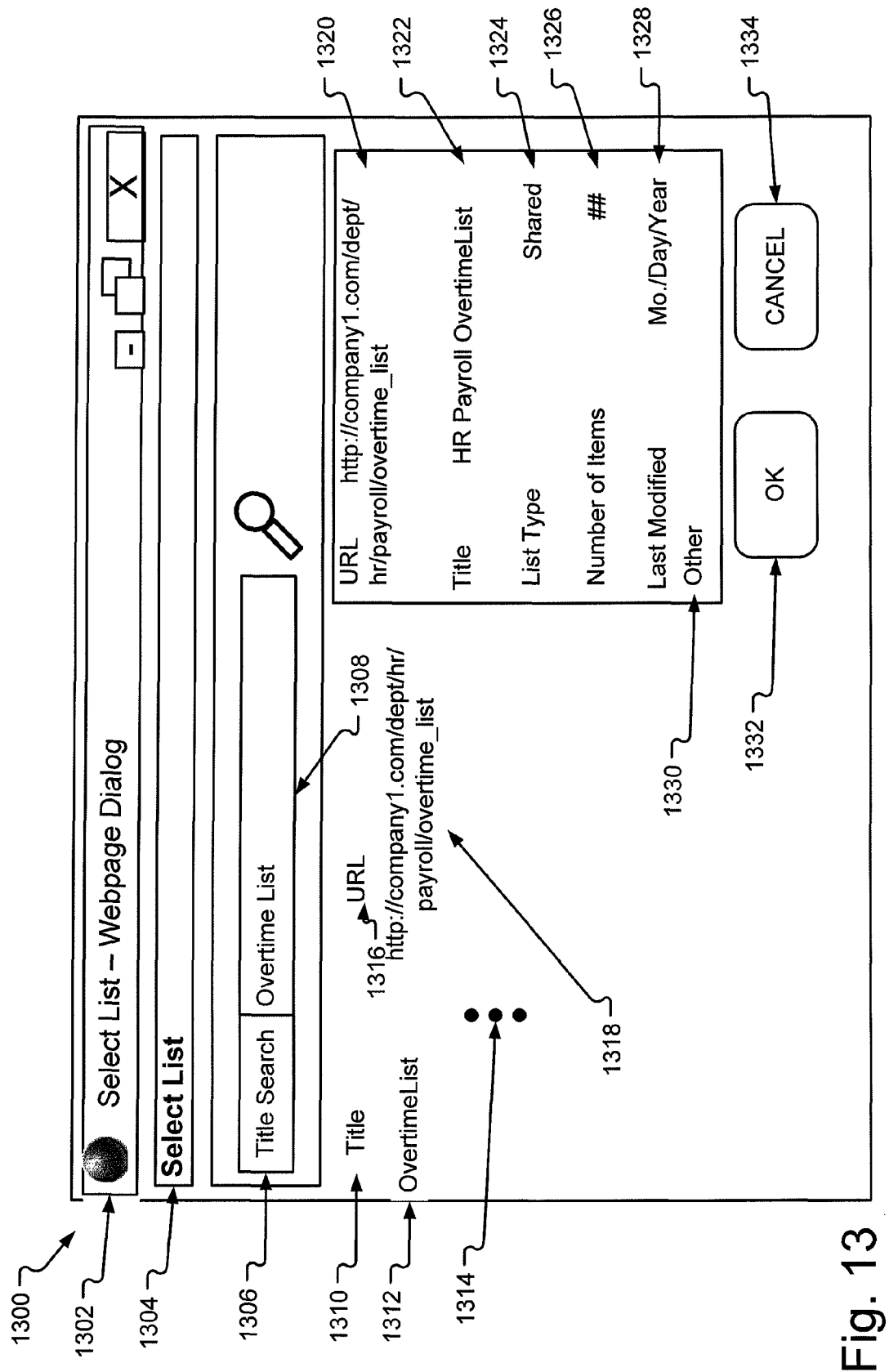
FIG. 13 depicts an example list selector user interface (UI) in accordance with an embodiment of the present disclosure.

Returning to FIG. 10C, the user next selects to "Change List" 1044, and process 1000 proceeds to receive a subset (e.g., n (of m)) of lists or document libraries at list selector, or list selector UI 1046. The subset of lists or document libraries is thus displayed at the list selector control, such as shown in FIG. 13 discussed below, based on ascending or descending order. The list selector control allows the user to search within the context of the site, advance to the "Next" and/or "Previous" pages, as well as control the number of items to be displayed or returned at any one time. In alternative embodiments, the selector UI does not allow the user to control the number of items to be displayed or returned. Instead, in such alternative embodiments, the underlying stored procedure allows the caller to specify the number of items to be returned or displayed at any one time. Query operation 1048 then allows the user to select a list or document library from the subset of lists or document libraries, search, or proceed to the next subset of lists or document libraries (unless the first subset included all lists or document libraries according to some embodiments). The user desires to advance to the "Next" page, process 1000 proceeds "Next" to receive subset of lists or document libraries 1046, in which additional lists or document libraries are displayed to the user. If the user chooses to select a particular list, process 1000 proceeds "Select" to receive information about the selection 1050. Such information includes, according to embodiments, the URL, Title, List Type, Number of Items, Last Modified indication, and/or any other relevant information about the list or document library. From there, the user can extract the necessary information and perform an operation, according to embodiments.

Returning to FIG. 10C, if the user desires to search for a particular list, process 1000 proceeds "Search" to enter search information 1052, in which the user enters search criteria or requirements. As shown in FIG. 13, the search for a list allows the user to enter a "Title" of the desired list or document library, according to an embodiment. After the search is conducted, the user receives a list of list(s) or document library (ies) meeting the search requirements 1054. The list collection selector thus allows the user to browse or search for a particular list or document library, for example, through an index view of the lists or document libraries. Process 1000 then terminates at END operation 1056.

FIGS. 10A, 10B, and 10C are merely examples of possible operational characteristics for searching for a specific site collection, site, and/or list or document library. Operational steps depicted may be combined into other steps, or additional steps may be added, for example.

While FIGS. 10A, 10B, and 10C depict the operational steps for searching for a specific site collection, site, and/or list or document library, FIG. 11 illustrates an example site collection selector UI 1100. While site collection selector UI 1100 is shown as a webpage dialog 1102 in accordance with an embodiment, other types of pages and UIs may be used in accordance with other embodiments. Site collection selector UI 1100 thus allows for exploring and searching for a site collection(s) 1104. As discussed above, this selection may occur when performing administrative operations on attached or unattached content databases. Site collection selector UI allows a URL of the site collection search at 1106 and data entry field 1108. For example, site collection selector UI shows an example search for the site collection URL entered at data entry field 1108 as "http://company1.com/dept/hr." Upon clicking on the button "OK" 1130 to start the search, search results are displayed at 1110, 1112, 1114, and 1116 according to an embodiment. While multiple search results meeting the search requirements are indicated by ellipses 1116, other embodiments provide for a single search result to be displayed. In embodiments, the user may also limit the number of results displayed per page, in which "Next" and "Previous" buttons allow a user to toggle between subsets of displayed results (not shown). Upon selecting a particular URL search result, the user can view the URL 1118, Title 1120, Description 1122, Primary Administrator 1123, E-mail Address 1124, Database Name 1126, and any other relevant information 1128 about the site collection. While examples of such information categories are shown in FIG. 11, such as "Title—HR Site Collection," etc., this sample information is offered by way of example only. Site collection selector UI 1100 thus presents an index view of search results to the user which enables a user to find and retrieve an item without opening each site collection, etc., thus promoting enhanced security and confidentiality, for example. At any time, a user may "Cancel" the site collection selector control UI page and return to the previous page by clicking on the "Cancel" button 1132. The components, controls, and other features depicted in FIG. 11 are offered by way of example only. Additional or fewer components, controls, and/or other features may be used in accordance with other embodiments of the present disclosure. Further, combinations of components, controls, and other features may be used in accordance with other embodiments as well.

While FIG. 11 depicts an example site collection selector, FIG. 12 illustrates an example site selector UI 1200, which allows a user, having previously selected a site collection, to select a site within the context of that site collection in accordance with embodiments. As discussed above, this selection may occur when performing administrative operations on attached or unattached content databases. While site selector UI 1200 is shown as a webpage dialog 1202 in accordance with an embodiment, other types of pages and UIs may be used in accordance with other embodiments. Site selector UI 1200 thus allows for exploring and searching for a site(s) 1204. Site selector UI allows a URL of the site search at 1206 and data entry field 1208. For example, site selector UI shows an example search for the site URL entered at data entry field 1208 as "http://company1.com/dept/hr/payroll." Upon clicking on the button "OK" 1226 to start the search, search results are displayed at 1210, 1212, 1214, and 1216 according to an embodiment. While multiple search results meeting the search requirements are indicated by ellipses 1216, other embodiments provide for a single search result to be displayed. In embodiments, the user may also limit the number of results displayed per page, in which "Next" and "Previous" buttons allow a user to toggle between subsets of displayed results (not shown). Upon selecting a particular URL search result, the user can view the URL 1218, Title 1220, Description 1222, and any other relevant information 1224 about the site. While examples of such information categories are shown in FIG. 12, such as "Title—HR Payroll Site," etc., this sample information is offered by way of example only. Site selector UI 1200 thus presents an index view of search results to the user which enables a user to find and retrieve an item without opening each site, etc., and thus provides enhanced security and confidentiality, for example. At any time, a user may "Cancel" the site selector control UI page and return to the previous page by clicking on the "Cancel" button 1228. The components, controls, and other features depicted in FIG. 12 are offered by way of example only. Additional or fewer components, controls, and/or other features may be used in accordance with other embodiments of the present disclosure. Further, combinations of components, controls, and other features may be used in accordance with other embodiments as well.

While FIG. 12 depicts an example site selector, FIG. 13 illustrates an example list selector UI 1300, which allows a user, having previously selected a site collection and a site, to select a list or document library within the context of that site, in accordance with embodiments. As discussed above, this selection may occur when performing administrative operations on attached or unattached content databases. While list selector UI 1300 is shown as a webpage dialog 1302 in accordance with an embodiment, other types of pages and UIs may be used in accordance with other embodiments. List selector UI 1300 thus allows for exploring and searching for a list(s) or document library(ies) 1304. List selector UI allows a Title of the list or document library search at 1306 and data entry field 1308. For example, list selector UI shows an example search for the list Title entered at data entry field 1308 as "Overtime List." Upon clicking on the button "OK" 1332 to start the search, search results are displayed at 1310, 1312, 1314, 1316, and 1318 according to an embodiment. While multiple search results meeting the search requirements are indicated by ellipses 1314, other embodiments provide for a single search result to be displayed. In embodiments, the user may also limit the number of results displayed per page, in which "Next" and "Previous" buttons allow a user to toggle between subsets of displayed results (not shown). Upon selecting a particular title or URL search result, the user can view the URL 1320, Title 1322, List Type 1324, Number of Items 1326, Last Modified indication 1328, and any other relevant information 1330 about the list (or document library). While examples of such information categories are shown in FIG. 13, such as "Title—HR Payroll OvertimeList," etc., this sample information is offered by way of example only. List selector UI 1300 thus presents an index view of search results to the user which enables a user to find and retrieve an item without opening each list (or document library), and thus promotes enhanced security and confidentiality, for example. At any time, a user may "Cancel" the selector control UI page and return to the previous page by clicking on the "Cancel" button 1334. The components, controls, and other features depicted in FIG. 13 are offered by way of example only. Additional or fewer components, controls, and/or other features may be used in accordance with other embodiments of the present disclosure. Further, combinations of components, controls, and other features may be used in accordance with other embodiments as well.

Figure 14:
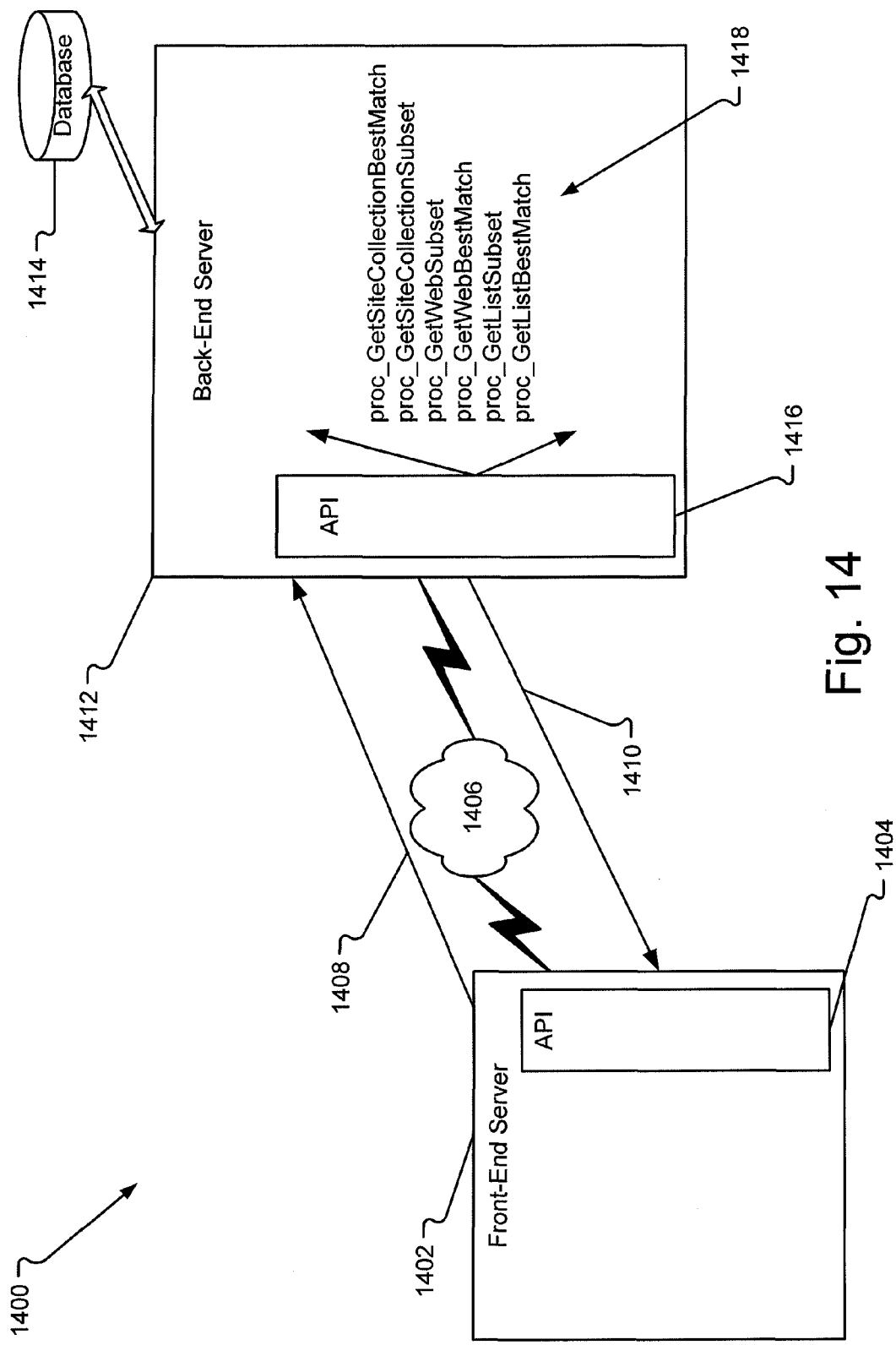
FIG. 14 depicts a logical representation of example functional component modules for communication sequences between a front-end Web or application server and a back-end database server with related content databases in accordance with an embodiment of the present disclosure.

Turning to FIG. 14, environment 1400 illustrates a front-end server 1402 and back-end database server 1412 connected by network 1406, according to an embodiment of the present disclosure. Database, or storage means 1414 are also depicted in FIG. 14 as connected to back-end database server 1412. These storage means and functional modules are offered by way of example only. Numerous types of modules, components, or storage means can be used in accordance with embodiments. To enable exploring and searching of attached and unattached content databases, requests are made 1408 through an application programming interface (API) 1404 on the front-end server 1402 to the back-end database server 1412, which provides or returns responses, outputs, and/or executed operations 1410, for example. In an embodiment, API 1404 on the front-end server 1402 interfaces with the API 1416 on the back-end database server 1412 to enable such exploring and searching of attached and unattached content databases. For example, the following APIs are used according to embodiments using MICROSOFT SHAREPOINT:

---

Public API:
    Namespace: Microsoft.SharePoint.Administration
    Class: SPContentDatabase
Method1: public static SPContentDatabase
CreateUnattachedContentDatabase(SqlConnectionStringBuilder
    connection)
Method2: public static SPContentDatabase
CreateUnattachedContentDatabase(
    String databaseInstanceServer,
    String databaseName,
    String username,
    String password).

---

For example, to accomplish such browsing and searching, stored procedures on the back-end database server 1412, or database server, are invoked 1418. In accordance with the Windows SharePoint Services Content Database Administrative Communications Version 2 Protocol Specification ("the MS-WSSCADM2 protocol"), such stored procedures include, for example:

proc_GetSiteCollectionBestMatch
proc_GetSiteCollectionSubset
proc_GetWebSubset
proc_GetWebBestMatch
proc_GetListSubset
proc_GetListBestMatch The MS-WSSCADM2 protocol provides communication sequences used by front-end servers (e.g., Web servers and application servers) for performing administrative operations on a back-end database server with related content databases. For example, with regard to the above-listed stored procedures, the MS-WSSCADM2 protocol specifies the following information.

The stored procedure "proc_GetSiteCollectionBestMatch," according to embodiments, is as follows:
proc_GetSiteCollectionBestMatch
The proc_GetSiteCollectionBestMatch stored procedure is called to get the site collection identifier and offset of the first site collection whose path starting with the value in @PathSearch when paths of all site collections' are sorted alphabetically in ascending order.

The T-SQL syntax for the stored procedure is as follows.

```
PROCEDURE proc__GetSitecollectionBestMatch (
    @PathSearch        nvarchar(128),
    @BestMatchSiteId   uniqueidentifier OUTPUT,
    @BestMatchOffset   int OUTPUT
);
```

@PathSearch: The path of the site collection to search. The path of a site collection is composed of the host header of the site collection and the store-relative form url of the root site in the site collection. The value, in embodiments, is as indicated in the following table (Table 1):

TABLE 1

| Path Value | Description |
|---|---|
| host header + '/' + store-relative form url | When host header is not NULL and the store-relative form URL is not empty |
| host header | When host header is not NULL and the store-relative form URL is empty |
| '/' + store-relative form url | When host header is NULL |

@BestMatchSiteId: The identifier of the first site collection whose path starts with the value of @PathSearch when paths of all site collections are sorted in ascending order.
@BestMatchOffset: The zero-based offset of the first site collection whose path starts with the value of @PathSearch when paths of all site collections are sorted in ascending order.
Return Code Values: This stored procedure returns 0 upon completion in embodiments.
Result Sets: In embodiments, no result sets are returned.

The stored procedure "proc_GetSiteCollectionSubset," according to embodiments, is as follows:
proc_GetSiteCollectionSubset
The proc_GetSiteCollectionSubset stored procedure is called to get a subset of site collection identifiers, paths whose row numbers are greater or equal than @StartRow and less than @StartRow+@PageSize when the names of site collections are sorted alphabetically in the direction specified by the @SortDirection parameter.

The T-SQL syntax for the stored procedure is as follows.

```
PROCEDURE proc__GetSiteCollectionSubset (
    @PageSize        int,
    @StartRow        int,
    @SortDirection   nvarchar(4)
);
```

@PageSize: The size of returned subset. @PageSize is greater than 0 in embodiments.
@StartRow: The row number which starts to get the subset site collections. @StartRow is greater or equal than 0 in embodiments.
@SortDirection: The string which specifies whether the sort direction is in descending order or ascending order. @SortDirection is either "DESC" or "ASC" in embodiments.
Return Code Values: This stored procedure returns 0 upon completion in embodiments.
Result Sets: Returns Get Site Collection Subset Result Set in embodiments.
The Get Site Collection Subset Result Set is as follows, according to embodiments:
Get Site Collection Subset Result Set
The Get Site Collection Subset result set returns the site collection identifiers and the paths of the site collections that are specified by @StartRow, @PageSize and @SortDirection. The Get Site Collection Subset result set, in embodiments, contains no rows if there is no site collections or no site collections match the condition that the row numbers are greater or equal than @StartRow and less than @StartRow+@PageSize when sorted all the site collections by names with the direction set in @SortDirection.

The T_SQL syntax for the result set is as follows:

| Id | uniqueidentifier | NOT NULL, |
|---|---|---|
| Path | nvarchar(385) | NOT NULL, |

Id: The site collection identifier
Path: The path of the site collection. The path is composed of the host header of the site collection and the store-relative form url of the root site. The value, in embodiments, is indicated in the following table (Table 2):

TABLE 2

| Path Value | Description |
|---|---|
| host header + '/' + store-relative form url | When host header is not NULL and the store-relative form url is not empty |
| host header | When host header is not NULL and the store-relative form url is empty |
| '/' + store-relative form url | When host header is NULL |

The stored procedure "proc_GetWebSubset," according to embodiments, is as follows:
proc_GetWebSubset
The proc_GetWebSubset stored procedure is called to get a subset of sites including site identifiers, store-relative url and path of the sites. The returned sites have row numbers greater than or equal to @StartRow and less than @StartRow+@PageSize when the names of all sites are sorted alphabetically in the direction specified by the @SortDirection parameter.
The T-SQL syntax for the stored procedure is as follows.

```
PROCEDURE proc_GetWebSubset (
    @SiteId         uniqueidentifier,
    @PageSize       int,
    @StartRow       int,
    @SortDirection  nvarchar(4)
);
```

@SiteId: The site collection identifier of the site collection that contains the sites.
@PageSize: The total number of returned rows. @PageSize is greater than 0 in embodiments.
@StartRow: The row number which starts to get the subset lists. @StartRow is greater than or equal to 0 in embodiments.
@SortDirection: The string which specifies whether the sort direction is descending order or ascending order. @SortDirection is either "DESC" or "ASC" in embodiments.
Return Code Values: This stored procedure returns 0 upon completion in embodiments.
Result Sets:
This procedure returns Get Web Subset Result Set in embodiments.
The Get Web Subset Result Set is as follows, according to embodiments:
Get Web Subset Result Set
The Get Web Subset result set returns the site identifier, store-relative url and path of the sites that are specified by @StartRow, @PageSize and @SortDirection. The Get Web Subset result set, in embodiments, contains no rows if there is no sites in the site collection or no sites match the condition that the row numbers are greater than or equal to @StartRow and less than @StartRow+@PageSize when names of all lists in the site are sorted in the direction set in @SortDirection.
The T_SQL syntax for the result set is as follows:

| Id      | uniqueidentifier | NOT NULL, |
|---------|------------------|-----------|
| FullUrl | nvarchar(256)    | NOT NULL, |
| Path    | nvarchar(385)    | NOT NULL, |

Id: The site identifier of the site.
FullUrl: The store-relative url of the site.
Path: The path of the site. The path is composed of the host header of the site collection and the store-relative url of the site. The value, according to embodiments, is as indicated in the following table (Table 3):

TABLE 3

| Path Value | Description |
|---|---|
| host header + '/' + store-relative form url | When host header is not NULL and the store-relative form url is not empty |
| host header | When host header is not NULL and the store-relative form url is empty |
| '/' + store-relative form url | When host header is NULL |

The stored procedure "proc_GetWebBestMatch," according to embodiments, is as follows:
proc_GetWebBestMatch
The proc_GetWebBestMatch stored procedure is called to get the site identifier and offset of the first site whose store-relative url starts with the value in @PathSearch when the store-relative url of all sites in the site collection are sorted alphabetically in ascending order.

The T-SQL syntax for the stored procedure is as follows.

```
PROCEDURE proc_GetWebBestMatch (
    @SiteId           uniqueidentifier,
    @PathSearch       nvarchar(128),
    @BestMatchWebId   uniqueidentifier OUTPUT,
    @BestMatchOffset  int OUTPUT,
    @RequestGuid      uniqueidentifier = null OUTPUT
);
```

@SiteId: The site collection identifier of the site collection which contains the sites being searched.
@PathSearch: The store-relative url of the site to search.
@BestMatchWebId: The site identifier of the first site whose store-relative url starts with the value of @PathSearch when store-relative url of all sites in the site collection are sorted in ascending order.
@BestMatchOffset: The zero-based offset of the first site whose store-relative url starts with the value of @PathSearch when store-relative url of all sites in the site collection are sorted alphabetically in ascending order.
@RequestGuid: The optional request identifier for the current request.
Return Code Values: This stored procedure returns 0 upon completion in embodiments.
Result Sets: Does not return any result sets in embodiments.
The stored procedure "proc_GetListSubset," according to embodiments, is as follows:
proc_GetListSubset
The proc_GetListSubset stored procedure is called to get a subset of the lists whose row numbers are greater or equal than @StartRow and less than @StartRow+@PageSize when all the lists in the site are sorted alphabetically in the direction set in @SortDirection.
The T-SQL syntax for the stored procedure is as follows.

```
PROCEDURE proc_GetListSubset (
    @WebId          uniqueidentifier,
    @PageSize       int,
    @StartRow       int,
    @SortDirection  nvarchar(4)
);
```

@WebId: The site identifier of the site.
@PageSize: The size of returned subset. @PageSize is greater than 0 in embodiments.
@StartRow: The row number which starts to return the subset lists. @StartRow is greater or equal than 0 in embodiments.
@SortDirection: The string which specifies whether the sort direction is in descending or ascending order. @SortDirection is either "DESC" or "ASC" in embodiments.
Return Code Values: This stored procedure returns 0 upon completion in embodiments.
Result Sets: This procedure returns the List Subset Result Set in embodiments.
A Get List Subset Result Set, according to embodiments, is as follows:
Get List Subset Result Set
The Get List Subset result set returns the list identifier and the name of the lists that are in the subset specified by @StartRow, @PageSize and @SortDirection. The Get List Subset result set, in embodiments, contains no rows if there are no lists in the site or no lists match the condition that the row numbers are greater or equal than @StartRow and less than @StartRow+@PageSize when sorted all lists by names with the direction set in @SortDirection.

The T-SQL syntax for the result set is as follows:

| tp_ | Id uniqueidentifier | NOT NULL, |
|---|---|---|
| tp_ | Title nvarchar(255) | NOT NULL, | tp_Id: The list identifier of the list.
tp_Title: The name of the list.
The stored procedure "proc_GetListBestMatch," according to embodiments, is as follows:
proc_GetListBestMatch
The proc_GetListBestMatch stored procedure is called to get the list identifier and offset of the first list starting with the value in @PathSearch when names of all lists in the site are sorted alphabetically in ascending order.
The T-SQL syntax for the stored procedure is as follows.

```
PROCEDURE proc_GetListBestMatch (
    @WebId            uniqueidentifier,
    @PathSearch       nvarchar(128),
    @BestMatchListId  uniqueidentifier OUTPUT,
    @BestMatchOffset  int OUTPUT,
    @RequestGuid      uniqueidentifier = null OUTPUT
);
```

@WebId: The site identifier of the site that contains lists.
@PathSearch: The name of the list to search.
@BestMatchListId: The list identifier of the first list whose name starts with the value of @PathSearch when the names of all lists in the site are sorted alphabetically in ascending order.
@BestMatchOffset: The zero-based offset of the first list whose name starts with the value of @PathSearch when the names of all lists in the site are sorted alphabetically in ascending order.
@RequestGuid: The optional request identifier for the current request.
Return Code Values: This stored procedure returns 0 upon completion in embodiments.
Result Sets: Does not return any result sets in embodiments.

The stored procedures described above thus enable the browsing and searching of attached and unattached content databases. As noted, these procedures are stored on the back-end database server(s), according to embodiments. For example, returning to FIG. 14 discussed above, if a protocol client desires to obtain the site identifier and offset of a first matched site, front-end server 1402, such as a front-end Web server, calls 1408 the stored procedure "proc_GetWebBestMatch" 1418, according to an embodiment. Back-end database server 1412 returns the site identifier and zero-based offset of the first found site through the output parameters @BestMatchWebID and @BestMatchOffSet, respectively, 1410. In another example embodiment, if a protocol client desires to obtain a subset of lists for a specific site, the stored procedure "proc_GetListSubset" 1418 is called 1408 multiple times to obtain the next set or other set of lists. The value @StartRow is used to specify the row number to start with. The value for @PageSize is used to specify the size of the returned subset. For example, front-end server 1402 calls 1408 the stored procedure "proc_GetListSubset" 1418, and the back-end database server 1412 returns the Get List Subset Result Set 1410. Front-end server 1402 calls 1408 the stored procedure "proc_GetListSubset" with a different value for @StartRow, and back-end server 1412 returns the Get List Subset Result Set 1410.

Figure 15:
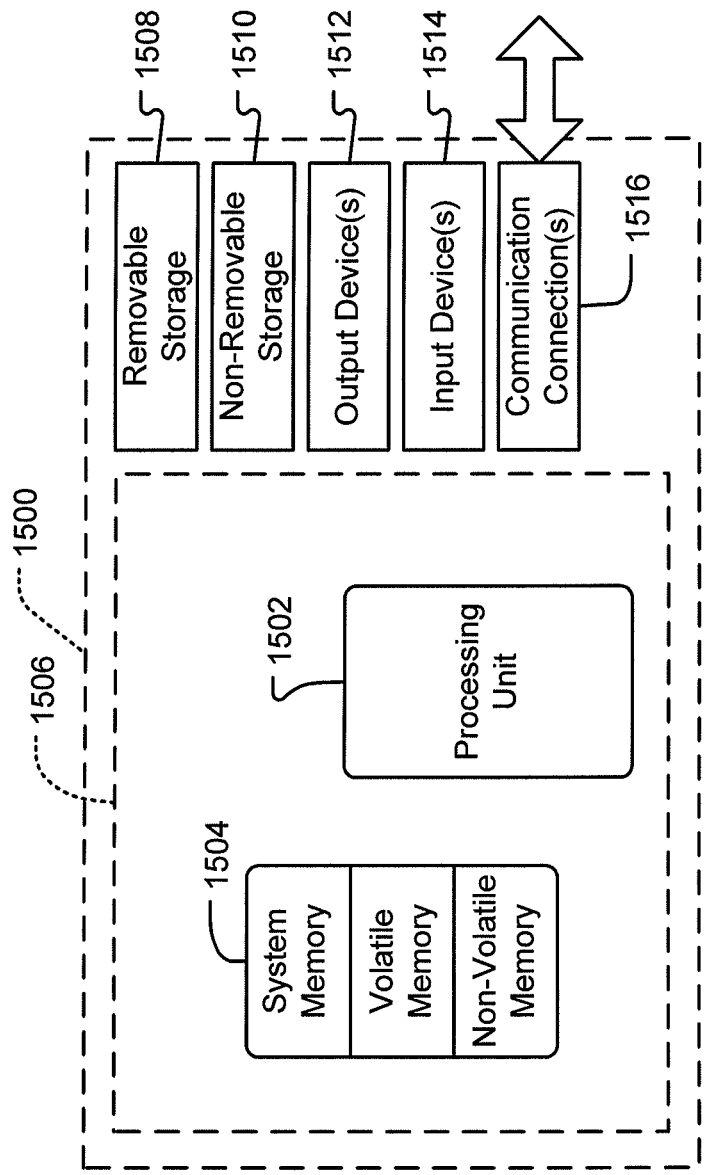
FIG. 15 depicts an example computing system upon which embodiments of the present disclosure may be implemented.

Finally, FIG. 15 illustrates an exemplary computing system 1500 upon which embodiments disclosed herein may be implemented. A computer system 1500, such as front-end server 1608, 1610, or 1612, for example, which has at least one processor 1502 is depicted in accordance with embodiments disclosed herein. The system 1500 has a memory 1504 comprising, for example, system memory, volatile memory, and non-volatile memory. In its most basic configuration, computing system 1500 is illustrated in FIG. 15 by dashed line 1506. Additionally, system 1500 may also include additional storage (removable and/or non-removable) including, but not limited to, magnetic or optical disks or tape. Such additional storage is illustrated in FIG. 15 by removable storage 1508 and non-removable storage 1510.

The term computer readable media as used herein may include computer storage media. Computer storage media may include volatile and nonvolatile, removable and non-removable media implemented in any method or technology for storage of information, such as computer readable instructions, data structures, program modules, or other data. System memory 1504, removable storage 1508, and non-removable storage 1510 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1500. Any such computer storage media may be part of device 1500. The illustration in FIG. 15 is intended in no way to limit the scope of the present disclosure.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

System 1500 may also contain communications connection(s) 1516 that allow the device to communicate with other devices. Additionally, to input content into the fields of a User Interface (UI) on client or browser computer 1604, for example, as provided by a corresponding UI module (not shown) on client computer 1604, for example, in accordance with an embodiment of the present disclosure, system 1500 may have input device(s) 1514 such as a keyboard, mouse, pen, voice input device, touch input device, etc. Output device(s) 1512 such as a display, speakers, printer, etc. may also be included. All of these devices are well known in the art and need not be discussed at length here. The aforementioned devices are examples and others may be used.

Having described embodiments of the present disclosure with reference to the figures above, it should be appreciated that numerous modifications may be made to the embodiments that will readily suggest themselves to those skilled in the art and which are encompassed within the scope and spirit of the present disclosure and as defined in the appended claims. Indeed, while embodiments have been described for purposes of this disclosure, various changes and modifications may be made which are well within the scope of the present disclosure.

Similarly, although this disclosure has used language specific to structural features, methodological acts, and computer-readable media containing such acts, it is to be understood that the subject matter defined in the appended claims is not necessarily limited to the specific structure, acts, features, or media described herein. Rather, the specific structures, features, acts, and/or media described above are disclosed as example forms of implementing the claims. Aspects of embodiments allow for multiple client computers, multiple front-end servers, multiple back-end database servers, multiple databases, and multiple networks, etc. Or, in other embodiments, a single client computer with a single front-end server, single back-end database server, single database and single network are used. One skilled in the art will recognize other embodiments or improvements that are within the scope and spirit of the present disclosure. Therefore, the specific structure, acts, or media are disclosed as example embodiments of implementing the present disclosure. The disclosure is defined by the appended claims.

What is claimed is:

1. A computer-implemented method for searching for data from a content database unattached to a content management application, the method executable on a client computing system communicatively connected to a front-end computing system executing the content management application and comprising the steps of:
   connecting the content management application and the unattached content database;
   receiving at the client computing system an indication to perform a search for a site collection;
   receiving at the client computing system a site collection selector user interface (UI) to perform a search for a site collection;
   entering at the client computing system one or more search requirements for a site collection to search for;
   receiving from the content management application a list of one or more site collections matching the one or more search requirements, wherein the content management application deletes orphaned databases;
   selecting a first site collection from the list of one or more site collections matching the one or more search requirements; and
   receiving at the client computing system information about the first site collection.

2. The computer-implemented method of claim 1, wherein the one or more search requirements for the site collection comprises a Uniform Resource Locator (URL) entered into a data entry field on the site collection selector UI.

3. The computer-implemented method of claim 1, wherein the information about the first site collection comprises one or more from the group consisting of: URL, title, primary administrator, e-mail address, and database name.

4. The computer-implemented method of claim 1, further comprising:
   receiving a site selector user interface (UI) to perform a search for a site;
   entering one or more search requirements for a site to search for;
   receiving a list of one or more sites matching the one or more search requirements;
   selecting a first site from the list of one or more sites matching the one or more search requirements; and
   receiving information about the first site.

5. The computer-implemented method of claim 4, wherein the one or more search requirements for a site comprises a Uniform Resource Locator (URL) entered into a data entry field of the site selector UI.

6. The computer-implemented method of claim 4, wherein the information about the first site comprises one or more from the group consisting of: URL, title, and description.

7. The computer-implemented method of claim 1, wherein the list of one or more site collections matching the one or more search requirements is displayed in an order comprising one from the group consisting of: ascending order and descending order.

8. The computer-implemented method of claim 4, further comprising:
   receiving a list selector user interface (UI) to perform a search for a list or document library;
   entering one or more search requirements for a list to search for;
   receiving a list of one or more lists matching the one or more search requirements;
   selecting a first list from the list of one or more lists matching the one or more search requirements; and
   receiving information about the first list.

9. The computer-implemented method of claim 8, wherein the one or more search requirements for the list comprises a title.

10. The computer-implemented method of claim 8, wherein the information about the first list comprises one or more from the group consisting of: URL, title, and description.

11. The computer-implemented method of claim 8, further comprising:
   selecting a first document from the unattached content database.

12. The computer-implemented method of claim 1, wherein a user performs an operation on the first site collection.

13. A computer system for enabling a user to search for content contained within a content database, the system comprising:
   at least one processor;
   memory coupled to the at least one processor, the memory comprising computer-program instructions executable by the at least one processor for:
      receiving a request to search for a site collection in the content database;
      receiving a request to search for a site in the content database; and
      invoking one or more stored procedures, wherein the one or more stored procedures comprise one or more from a group of stored procedures consisting of: proc_GetSiteCollectionBestMatch, proc_GetSiteCollectionSubset, proc_GetWebSubset, proc_GetWebBestMatch, proc_GetListSubset, and proc_GetListBestMatch.

14. The computer system of claim 13, wherein syntax for the procedure "proc_GetListBestMatch" comprises a "BestMatchListId," wherein the "BestMatchListID" is a list identifier.

15. The computer system of claim 13, wherein the procedure named "proc_GetWebSubset" is called to obtain a subset of sites, and wherein the subset of sites includes information comprising one or more from the group consisting of: site identifiers, store-relative URLs of the sites, and paths of the sites.

16. One or more computer storage devices having computer readable instructions stored thereon, the computer-readable instructions, when executed by one or more processors, cause the one or more processors to perform acts for searching for data, the acts comprising:

establishing a connection from a content management application to an unattached content database;
receiving an indication to perform a search for a site collection;
receiving a site collection selector user interface (UI) to perform a search for a site collection;
entering one or more search requirements for searching for a site collection;
receiving from the content management application a list of one or more site collections matching the one or more search requirements for the site collection;
selecting a first site collection from the list of one or more site collections matching the one or more search requirements;
receiving information about the first site collection;
receiving an indication to perform a search for a site with a context of the first site collection;
receiving a site selector user interface (UI) to perform a search for the site;
entering one or more search requirements for searching for the site;
receiving from the content management application a list of one or more sites matching the one or more search requirements for the site, wherein the content management application deletes orphaned databases;
selecting a first site from the list of one or more sites matching the one or more search requirements for the site;
receiving an indication to perform a search for a document library within the context of the first site;
receiving a list selector UI to perform a search for the document library; and
entering one or more search requirements for searching for the document library.

17. The one or more computer storage devices of claim 16, wherein the one or more search requirements for the site collection comprises a Uniform Resource Locator (URL) entered into a data entry field of the site collection selector UI.

18. The one or more computer storage devices of claim 16, wherein the one or more search requirements for the document library comprises a title entered into a data entry field of the list selector UI.

19. The one or more computer storage devices of claim 16, further comprising:
receiving a list of one or more document libraries matching the search requirements for the document library;
selecting a first document library from the list of one or more document libraries; and
requesting to export content related to the first document library.

20. The one or more computer storage devices of claim 16, further comprising:
receiving a list of one or more document libraries matching the search requirements for the document library;
selecting a first document library from the list of one or more document libraries; and
requesting to perform an operation on content related to the first document library.

\* \* \* \* \*